(12) United States Patent
Lambic et al.

(10) Patent No.: US 11,802,170 B2
(45) Date of Patent: Oct. 31, 2023

(54) POLYOLEFINS PREPARED WITH BINUCLEAR METALLOCENE CATALYSTS

(71) Applicant: ExxonMobil Chemical Patents Inc., Baytown, TX (US)

(72) Inventors: Nikola S. Lambic, Houston, TX (US); An Ngoc-Michael Nguyen, Pearland, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 17/728,200

(22) Filed: Apr. 25, 2022

(65) Prior Publication Data

US 2022/0372178 A1 Nov. 24, 2022

Related U.S. Application Data

(60) Provisional application No. 63/181,679, filed on Apr. 29, 2021.

(51) Int. Cl.
| | |
|---|---|
| *C08F 4/6592* | (2006.01) |
| *C08F 10/06* | (2006.01) |
| *C08F 110/06* | (2006.01) |
| *C07F 17/00* | (2006.01) |
| *C08F 4/64* | (2006.01) |

(Continued)

(52) U.S. Cl.
CPC .......... *C08F 4/64182* (2013.01); *C07F 17/00* (2013.01); *C08F 4/6592* (2013.01); *C08F 4/65904* (2013.01); *C08F 4/65927* (2013.01); *C08F 10/02* (2013.01); *C08F 10/06* (2013.01);

(Continued)

(58) Field of Classification Search
CPC .. C08F 4/6426; C08F 4/6592; C08F 4/65925; C08F 110/06; C08F 4/65904; C08F 4/65927; C07F 17/00
See application file for complete search history.

(56) References Cited

U.S. PATENT DOCUMENTS

| | | | |
|---|---|---|---|
| 5,830,958 A | 11/1998 | Peifer et al. | 526/113 |
| 6,153,776 A | 11/2000 | Patton et al. | 556/11 |
| 6,175,409 B1 | 1/2001 | Nielsen et al. | 356/337 |
| 6,260,407 B1 | 7/2001 | Petro et al. | 73/61.52 |
| 6,262,197 B1 | 7/2001 | Aulbach et al. | 526/127 |
| 6,294,388 B1 | 9/2001 | Petro | 436/8 |
| 6,406,632 B1 | 6/2002 | Safir et al. | 210/656 |
| 6,436,292 B1 | 8/2002 | Petro | 210/656 |
| 6,454,947 B1 | 9/2002 | Safir et al. | 210/656 |

(Continued)

FOREIGN PATENT DOCUMENTS

| | | | |
|---|---|---|---|
| CN | 102942641 | 2/2015 | ............ C07F 17/00 |
| CN | 108530492 | 9/2018 | ............ C07C 1/32 |

(Continued)

OTHER PUBLICATIONS

Li, Hongbo et al. (2005) "Significant Proximity and Cocatalyst Effects in Binuclear Catalysis for Olefin Polymerization," *Macromolecules*, v.38(22), pp. 9015-9027.

(Continued)

*Primary Examiner* — Caixia Lu

(57) ABSTRACT

A catalyst compound and process for olefin polymerization. The catalyst can be represented by Formula (I):

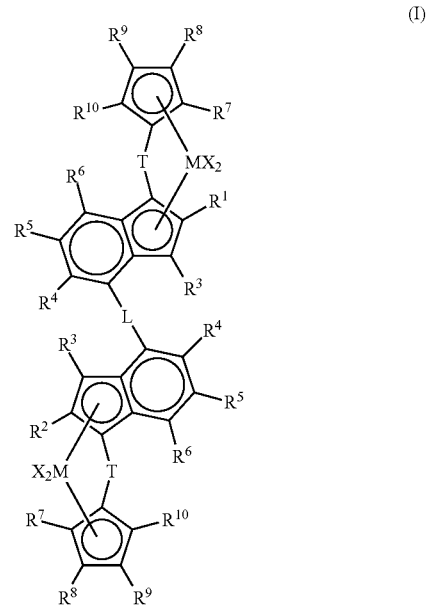

(I)

wherein: M is a transition metal selected from group 3, 4, or 5 of the Periodic Table of Elements; L is a linking group selected from any one or more difunctional $C_1$-$C_{20}$ hydrocarbyl, aryl or substituted aryl groups; T is an optional bridging group; each X is a univalent anionic ligand, or two Xs are joined and bound to the metal atom to form a metallocycle ring, or two Xs are joined to form a chelating ligand, a diene ligand, or an alkylidene ligand; $R^1$ and $R^2$ are each independently a hydrogen atom or substituted or unsubstituted $C_1$ to $C_{20}$ hydrocarbyl group; $R^3$, $R^5$, $R^6$ and $R^7$ are each independently a hydrogen atom or a substituted or unsubstituted $C_1$ to $C_{20}$ hydrocarbyl group, and, optionally, any two of $R^5$, $R^6$, and $R^7$ can be joined to form a cyclic structure; $R^4$ is a substituted or unsubstituted aryl group; and $R^8$, $R^9$, $R^{10}$, and $R^{11}$ are each independently a substituted or unsubstituted $C_1$ to $C_6$ hydrocarbyl group and, optionally, $R^9$ and $R^{10}$ are joined to form a cyclic structure.

20 Claims, No Drawings

(51) Int. Cl.
*C08F 10/02* (2006.01)
*C08F 4/659* (2006.01)

(52) U.S. Cl.
CPC ........ *C08F 110/06* (2013.01); *C08F 2420/10* (2021.01)

(56) References Cited

U.S. PATENT DOCUMENTS

| | | | |
|---|---|---|---|
| 6,461,515 B1 | 10/2002 | Safir et al. | 210/656 |
| 6,475,391 B2 | 11/2002 | Safir et al. | 210/656 |
| 6,491,816 B2 | 12/2002 | Petro | 210/198.2 |
| 6,491,823 B1 | 12/2002 | Safir et al. | 210/656 |
| 9,266,910 B2 | 2/2016 | McCullough | C07F 7/00 |
| 9,309,340 B2 | 4/2016 | Ishihama et al. | C08F 210/16 |
| 2003/0069373 A1 | 4/2003 | Holtcamp et al. | C07F 17/02 |

FOREIGN PATENT DOCUMENTS

| | | | |
|---|---|---|---|
| CN | 111116788 | 5/2020 | C08F 110/06 |
| CN | 111116789 | 5/2020 | C08F 110/06 |
| EP | 0632063 | 8/1998 | C08F 210/02 |
| EP | 2231717 | 10/2015 | C08F 4/6592 |
| EP | 3441407 | 2/2019 | C08F 10/06 |
| KR | 2013-0027316 | 3/2013 | C08F 10/00 |
| KR | 2021-0012543 | 2/2021 | C07F 17/00 |
| WO | 2004/076502 | 9/2004 | C08F 10/00 |
| WO | 2015/024938 | 2/2015 | C07F 5/02 |
| WO | 2019/160719 | 8/2019 | A61K 31/4168 |

OTHER PUBLICATIONS

Li, Hongbo et al. (2006) "Nuclearity and Cooperativity Effects in Binuclear Catalysts and Cocatalysts for Olefin Polymerzation," *PNAS*, v.103(42), pp. 15295-15302.

Spaleck, W. et al. (1998) "New Bridged Zirconocenes for Olefin Polymerization: Binuclear and Hybrid Structures," *J. Mol. Cat. A: Chemical*, v.128, pp. 279-287.

Sun, T. et al. (2001) "Effect of Short Chain Branching on the Coil Dimensions of Polyolefins in Dilute Solution," *Macromolecules*, v.34, pp. 6812-6820.

POLYOLEFINS PREPARED WITH BINUCLEAR METALLOCENE CATALYSTS

CROSS REFERENCE TO RELATED APPLICATIONS

This application claims the benefit of and priority to U.S. Provisional Application No. 63/181,679 filed Apr. 29, 2021, the disclosure of which is incorporated herein by reference.

FIELD

Embodiments of the present invention generally relate to the synthesis of linked bi-indene complexes and their application in preparing binuclear metallocene catalysts for polyolefin production.

BACKGROUND

In general, binuclear metallocene catalysts are molecular species where two metallocene centers ($M_1$, $M_2$) are chemically linked via a covalent linker (L) as shown below:

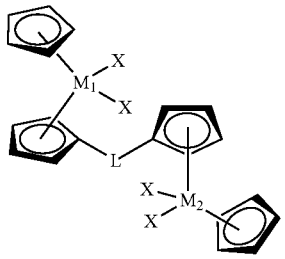

$M_1$ - metallocene center 1 $M_2$ - metallocene center 2 L - covalent linker (alkyl, aryl, heteroatom, etc...)

Binuclear metallocene catalysts have been used to produce polyolefins with different properties relative to their mononuclear analogs. Most binuclear compounds reported in the literature have complexes bridged by a substituted Cp or indene moiety. State-of-the-art metallocene catalysts for olefin polymerization are typically bridged compounds that have a substituted indenyl ligand, where different substitution patterns have dramatic effects on catalysts activities and polymer properties. The nomenclature of indene substitution is shown below.

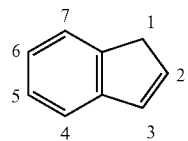

Little is known about the potential application of these binuclear compounds in polyolefins. Most efforts within indenyl substituted metallocenes have been placed on complexes linked in either a 1 (or 3 by the virtue of symmetry) and a 2 position. While the majority of work with respect to binuclear catalysts has been placed on polyethylene, very little is known about the potential application of binuclear compounds in polypropylene other than substitution in the 1 or 3-position, which have been detrimental for polypropylene catalysts. This is likely because PP metallocene catalysts experience reduction in activity and molecular weight capability when there is an alkyl/aryl substitution in the 3-position. This substitution pattern interferes sterically with growing polymer chain and for that reason it promotes: 1) slow migratory insertion (chain growth) and 2) more facile elimination (via beta hydrogen or beta methyl abstraction. Most state of the art molecules have only H in the 3-position and are bridged (therefore, the bridge can occupy the 1 position (or 3, by the virtue of indene symmetry).

Relevant publications include EP 0632063B1 describing polynuclear metallocene catalyst with enhanced activities. Spaleck, W. et al. (1998) "New Bridged Zirconocenes for Olefin Polymerization: Binuclear and Hybrid Structures," *J. Mol. Cat. A: Chemical*, v. 128, pp. 279-287 discloses a hybrid bimetallic metallocene catalyst derived from a dimethylsilyl bridged 2-Me-4-Ph rac-bisindenyl, which is linked through the silane bridge. This bimetallic compound was shown to have decreased activity and lower polypropylene melting point relative to control catalyst. U.S. Pat. Nos. 5,830,958 and 6,262,197 disclose linkages directly through metal-alkyl fragment installed via pendant olefinic group, or via silane tether capable of supporting multiple bridges and ligands. U.S. Pat. No. 6,153,776; Li, Hongbo et al. (2006) "Nuclearity and Cooperativity Effects in Binuclear Catalysts and Cocatalysts for Olefin Polymerization," *PNAS*, v. 103 (42), pp. 15295-15302; Li, Hongbo et al. (2005) "Significant Proximity and Cocatalyst Effects in Binuclear Catalysis for Olefin Polymerization," *Macromolecules*, v. 38(22), pp. 9015-9027 disclose binuclear constrained geometry catalysts (CGCs). US 2003/0069373 describes a metal amide route towards binuclear metallocene complexes. WO 2019/160719A1 demonstrates the application of a methyl-pyridine linked binuclear system in ethylene/hexene copolymerization. U.S. Pat. No. 9,266,910B2 describes the synthesis and polymerization of propylene with Me4CpSiMe2-2-alkyl-4-Ar-Indenyl catalysts. Similar catalysts were employed for ethylene based polymer in U.S. Pat. No. 9,309,340. Similar catalysts for high-melt strength PP are disclosed in EP 3441407A1. WO 2015/024938A1 discloses a cross-coupling step describing a bi-aryl linker in the 2-position of indene. Other references of interest include: WO 2004/076502A1 discloses binuclear Cp linked catalysts for polyethylene, CN 102942641B, EP 2231717 and CN 108530492 disclose binuclear fluorenyl/cyclopentadienyl variants, KR 10-2013-0027316 focuses on cyclopentadienyl variants with a linker that contains silyl moiety. CN 111116789 and CN 111116788 demonstrate dinuclear biindene versions. KR 10-2021-0012543 discloses binuclear complexes linked via hydrocarbyl group connecting two metallocene centers via organometallic bond.

SUMMARY

A catalyst compound and process for olefin polymerization using the catalyst compound are provided herein. The catalyst can be represented by Formula (I):

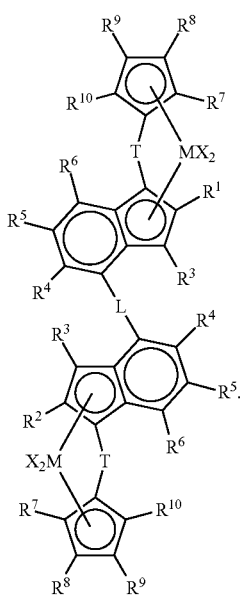

(I)

wherein: M is a transition metal selected from group 3, 4, or 5 of the Periodic Table of Elements; L is a linking group selected from any one or more difunctional $C_1$-$C_{20}$ hydrocarbyl, aryl or substituted aryl groups; T is an optional bridging group; each X is a univalent anionic ligand, or two Xs are joined and bound to the metal atom to form a metallocycle ring, or two Xs are joined to form a chelating ligand, a diene ligand, or an alkylidene ligand; $R^1$ and $R^2$ are each independently a hydrogen atom or substituted or unsubstituted $C_1$ to $C_{20}$ hydrocarbyl group; $R^3$, $R^5$, $R^6$ and $R^7$ are each independently a hydrogen atom or a substituted or unsubstituted $C_1$ to $C_{20}$ hydrocarbyl group, and, optionally, any two of $R^5$, $R^6$, and $R^7$ can be joined to form a cyclic structure; $R^4$ is a substituted or unsubstituted aryl group; and $R^8$, $R^9$, $R^{10}$, and $R^{11}$ are each independently a substituted or unsubstituted $C_1$ to $C_6$ hydrocarbyl group and, optionally, $R^9$ and $R^{10}$ are joined to form a cyclic structure.

The process can include reacting a first olefin and optionally a second olefin in the presence of the bimetallocene catalyst compound represented by Formula (I), in a reactor to form a polymer having significantly improved mechanical properties and co-monomer incorporation.

DETAILED DESCRIPTION

Binuclear metallocene catalysts with indene linkage in the 4-position, leading to 4,4'-biindenes are provided as well as methods for making same and the polymers made therefrom. The catalysts can be symmetric or asymmetric. Depending on the substitution pattern, novel species have been found to have improved activities and co-monomer incorporation for ethylene propylene (EP) co-polymers.

In one embodiment, the binuclear metallocenes of the present invention are $C_1$ symmetric (i.e. asymmetric) metallocenes based on bridged tetramethylcyclopentadienyl ($Me_4Cp$)/2-Me-4-Ar indenes. The two metallocene centers can be chemically linked in the 4-position using hydrocarbyl or aromatic linkers. It has been unexpectedly and surprisingly discovered that two metallocene centers that are chemically linked through the 4-position of their respective indenyl ligands provide EP copolymers with significantly improved mechanical properties and co-monomer incorporation.

The general structure for the binuclear metallocenes provided herein can be described below.

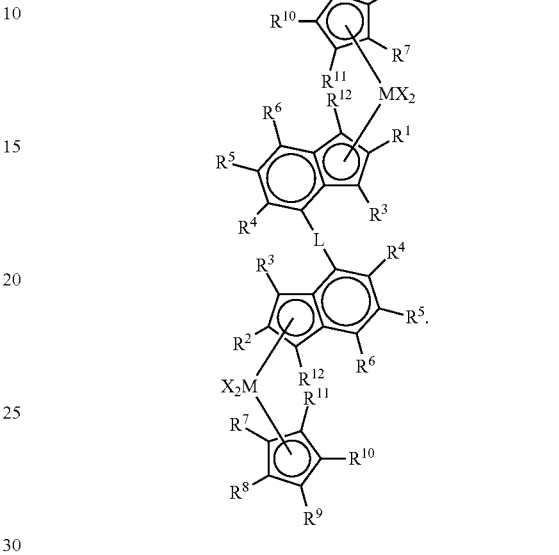

where:

M is a transition metal atom selected from group 3, 4, or 5 of the Periodic Table of Elements;

each X is a univalent anionic ligand, or two Xs are joined and bound to the metal atom to form a metallocycle ring, or two Xs are joined to form a chelating ligand, a diene ligand, or an alkylidene ligand;

L is a linking group and selected from any one or more difunctional $C_1$-$C_{20}$ hydrocarbyl, aryl or substituted aryl groups.

$R^1$ and $R^2$ is a substituted or unsubstituted $C_1$ to a $C_{20}$ hydrocarbyl group or hydrogen;

$R^3$, $R^4$, $R^5$ and $R^6$ and $R^{12}$ are each independently a hydrogen atom or a substituted or unsubstituted $C_1$ to a $C_{20}$ hydrocarbyl group and any two of $R^4$, $R^5$, and $R^6$ adjacent to each other can be joined to form a cyclic structure;

$R^7$, $R^8$, $R^9$, $R^{10}$ and $R^{11}$ are each independently a substituted or unsubstituted $C_1$ to a $C_6$ hydrocarbyl group and any two adjacent $R^7$, $R^8$, $R^9$, $R^{10}$ and $R^{11}$ can be joined to form a cyclic structure.

In one aspect, $R^1$ and $R^2$ are identical and constitute primary substituted or unsubstituted $C_1$-$C_{12}$ alkyl group such as methyl, ethyl or isopropyl.

In one aspect, $R^1$ and $R^2$ are not identical and may involve a primary substituted or unsubstituted $C_1$-$C_{12}$ alkyl group such as methyl, ethyl, isopropyl, butyl, pentyl or hexyl.

In still another aspect, $R^3$, $R^4$, $R^5$ and $R^6$ can be hydrogen.

In still another aspect, L can be a linear difunctional $C_2$-$C_{10}$ hydrocarbyl or an unsubstituted or substituted difunctional phenyl group. In still another aspect, L can be a linear difunctional $C_5$ hydrocarbyl or an unsubstituted or substituted di-functional phenyl group.

Alternatively, the binuclear metallocene compound may be represented by the following bridged structure:

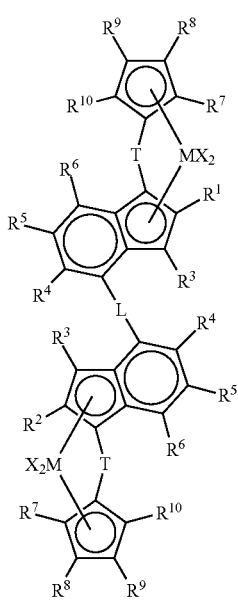

where M is a transition metal atom selected from group 3, 4, or 5 of the Periodic Table of Elements;

T is represented by the formula, (R*2G)g, where each G is C, Si, or Ge, g is 1 or 2, and each R* is, independently, hydrogen, halogen, $C_1$ to $C_{20}$ hydrocarbyl or a $C_1$ to $C_{20}$ substituted hydrocarbyl, and two or more R* can form an aromatic or a partially saturated or saturated cyclic or fused ring system;

L is a linking group and selected from any one or more difunctional $C_1$-$C_{20}$ hydrocarbyl, aryl or substituted aryl groups;

each X is a univalent anionic ligand, or two Xs are joined and bound to the metal atom to form a metallocycle ring, or two Xs are joined to form a chelating ligand, a diene ligand, or an alkylidene ligand;

$R^1$ and $R^2$ are substituted or unsubstituted $C_1$ to a $C_{20}$ hydrocarbyl group;

$R^3$, $R^5$, $R^6$ and $R^7$ are each independently a hydrogen atom or a substituted or unsubstituted $C_1$ to a $C_{20}$ hydrocarbyl group and any two of $R^5$, $R^6$, and $R^7$ adjacent to each other can be joined to form a cyclic structure;

$R^8$, $R^9$, $R^{10}$ and $R^{11}$ are each independently a substituted or unsubstituted $C_1$ to a $C_6$ hydrocarbyl group and $R^9$ and $R^{10}$ can be joined to form a cyclic structure.

In one aspect, $R^1$ and $R^2$ are identical and constitute primary substituted or unsubstituted $C_1$-$C_{12}$ alkyl group such as methyl, ethyl or isopropyl.

In one aspect, $R^1$ and $R^2$ are not identical and constitute primary substituted or unsubstituted $C_1$-$C_{12}$ alkyl group such as methyl, ethyl or isopropyl.

In still another aspect, $R^3$, $R^4$, $R^5$ and $R^6$ can be hydrogen.

In still another aspect, L can be a linear difunctional $C_2$-$C_{10}$ hydrocarbyl or an unsubstituted or substituted difunctional phenyl group. In still another aspect, L can be a linear difunctional $C_5$ hydrocarbyl or an unsubstituted or substituted di-functional phenyl group.

It should be understood that any of the selections of substituents and groups noted above can be combined in any manner and are not limiting.

The binuclear metallocenes can be synthesized using a one-step coupling mechanism. The common preparative method involves cross coupling chemistry by using difunctionalized coupling partners (either difunctional Grignard reagents, zinc compounds, alkyl, alkenyl or aryl organotin or organocopper reagents, boronic acids or pinacolboranes).

In certain embodiments, the binuclear metallocenes provided herein can be synthesized through a homo-linkage of two indenes (compounds E1-E3), via a phenyl linker (E4 and E5) or via an alkyl (pentyl) linker (compounds E6-E9) substituted in various positions. The complex schematics that follow show an asymmetric zirconium metallocene $C_1$, $C_2$ being diversified at the "link here" position to provide compounds E1-E9.

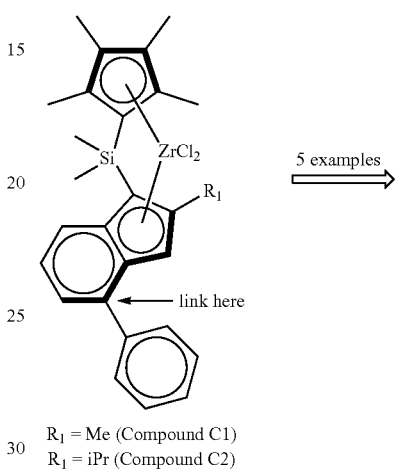

$R_1$ = Me (Compound C1)
$R_1$ = iPr (Compound C2)

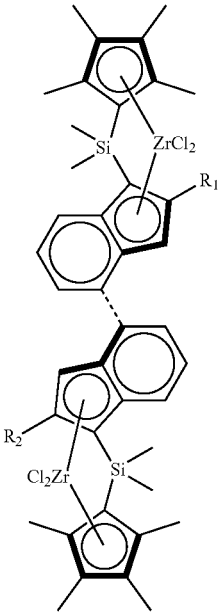

4,4' biindene compounds
$R_1$ = Me; $R_2$ = Me -E1
$R_1$ = Me; $R_2$ = iPr -E2
$R_1$ = iPr; $R_2$ = iPr -E3

More specifically, the binuclear metallocenes E1-E9 can be represented as follows:
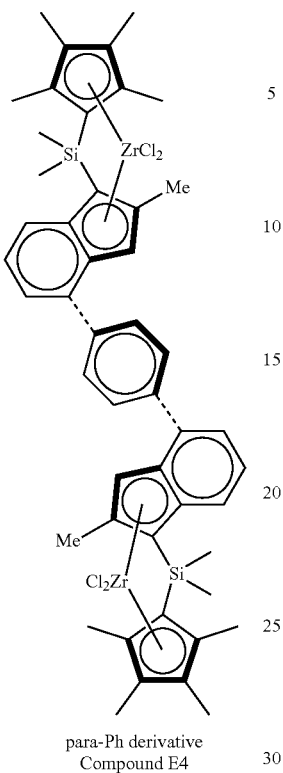
para-Ph derivative
Compound E4
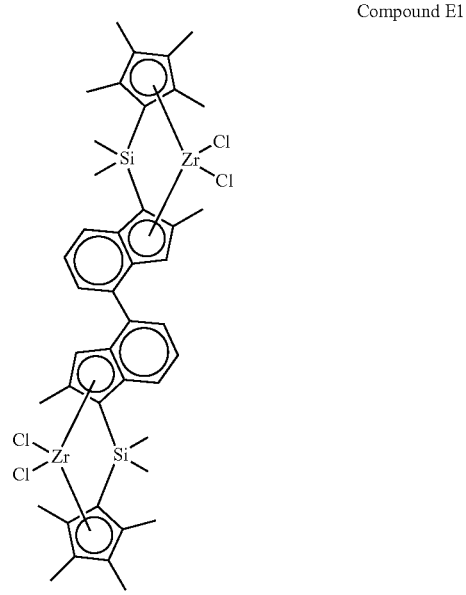
Compound E1
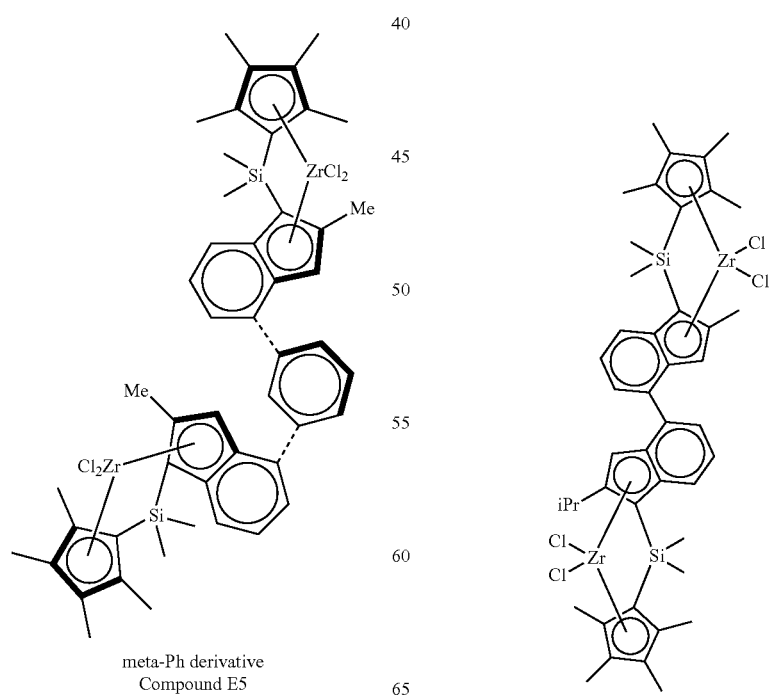
meta-Ph derivative
Compound E5
Compound E2

Compound E3
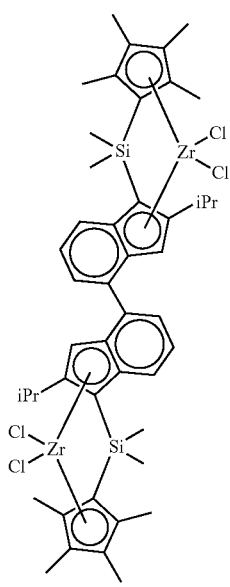
Compound E4
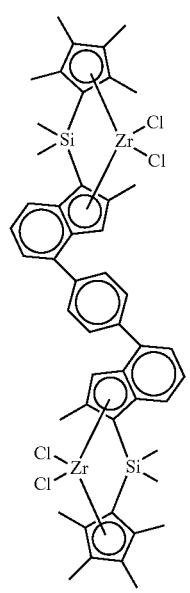
Compound E5
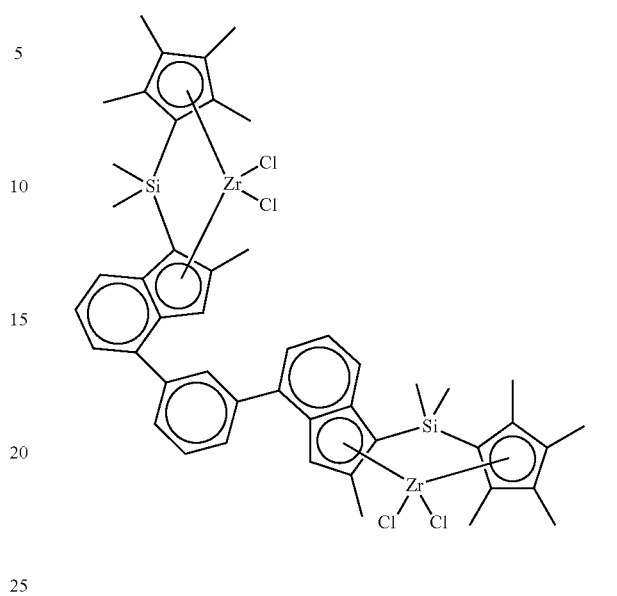
Compound E6
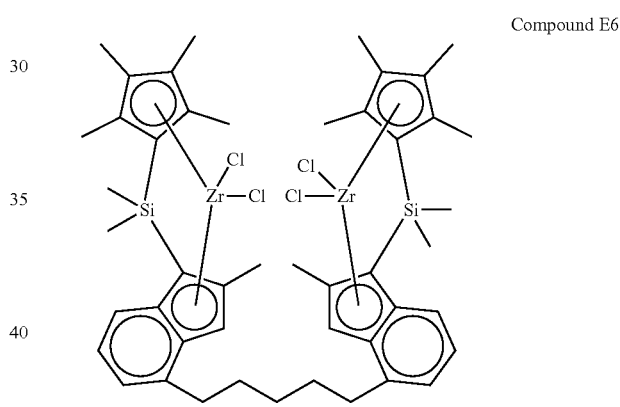
Compound E7
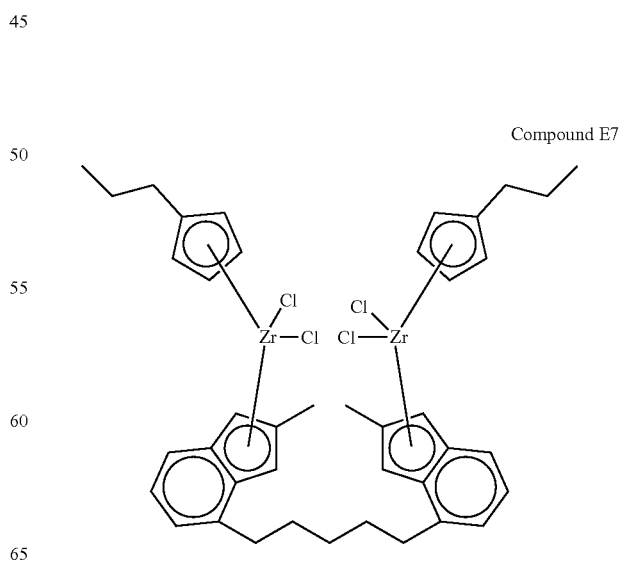

Compound E8
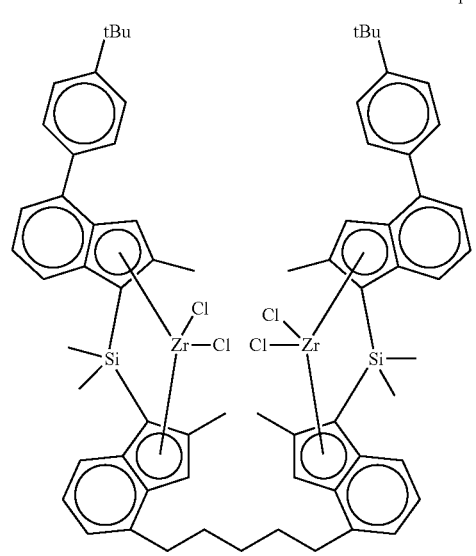
Compound E9
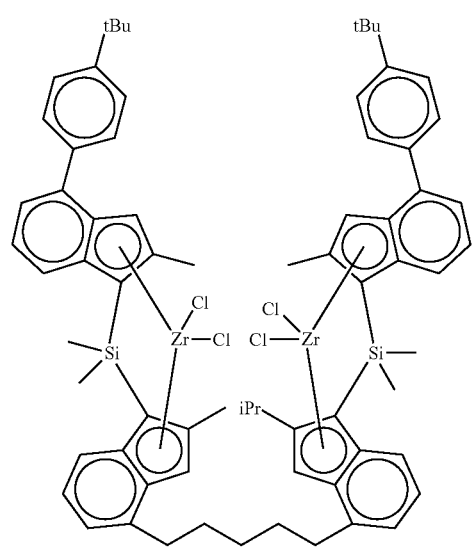
Compound E10
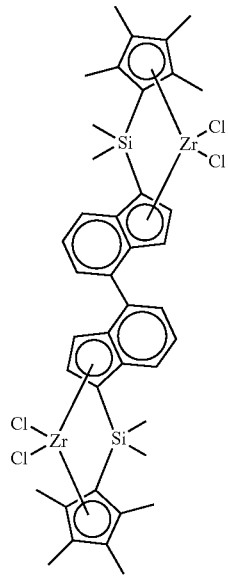
Compound E11
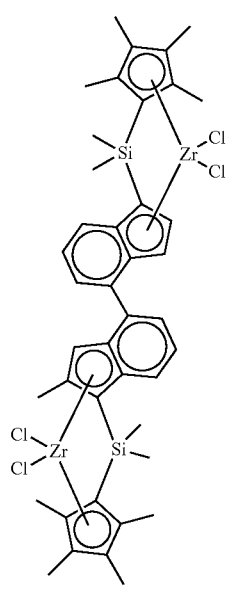
Other specific binuclear metallocenes (E10-E37), according to one or more embodiments provided herein, follow below:

Compound E12
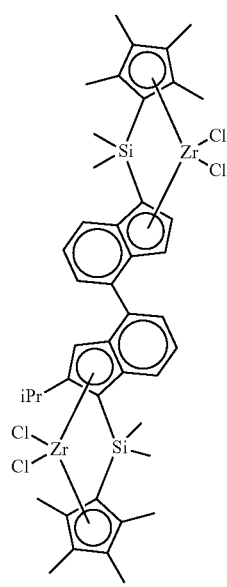
Compound E13
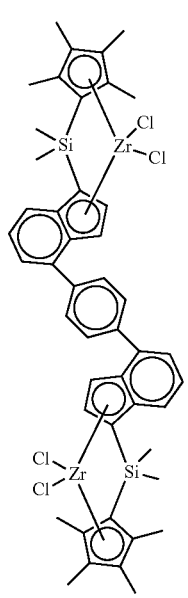
Compound E14
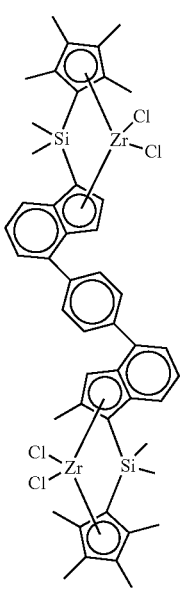
Compound E15

Compound E16
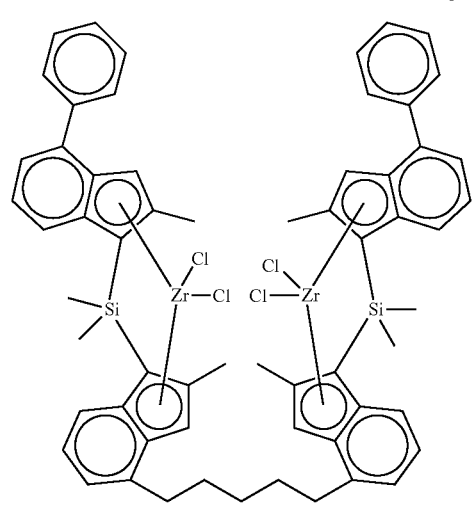
Compound E17
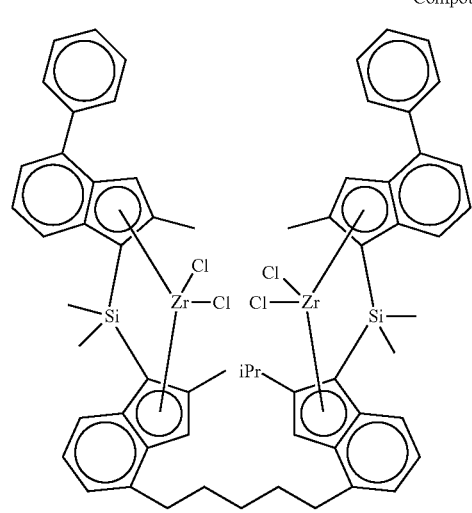
Compound E18
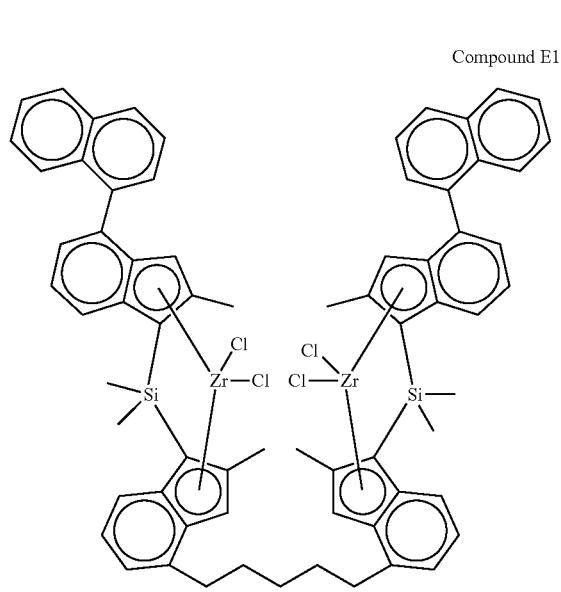
Compound E19
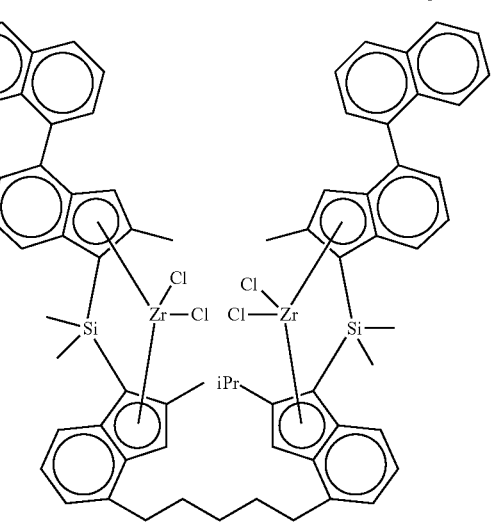
Compound E20
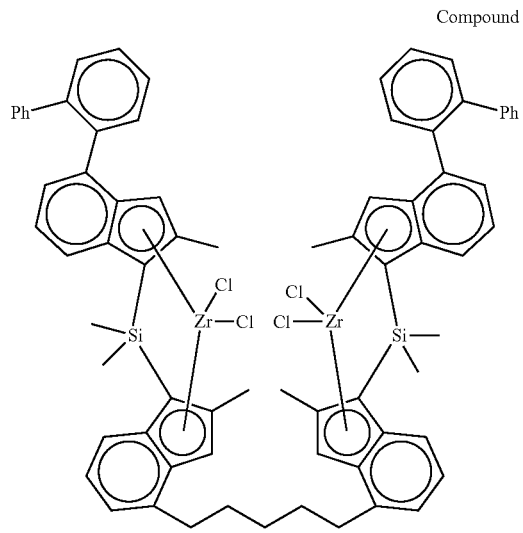
Compound E21
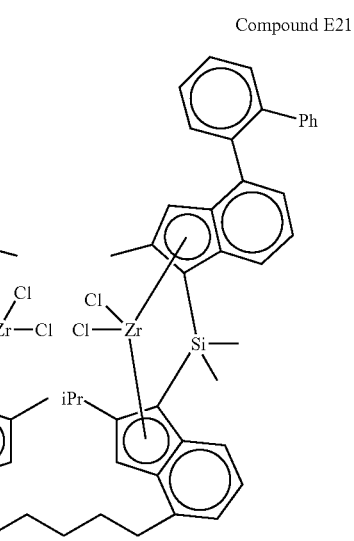

Compound E22
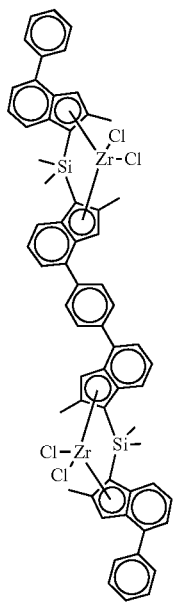
Compound E23
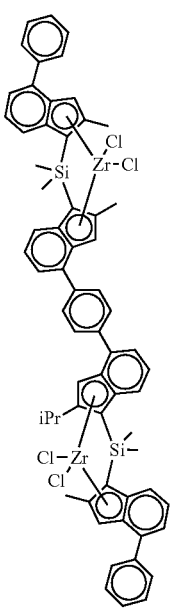
Compound E24
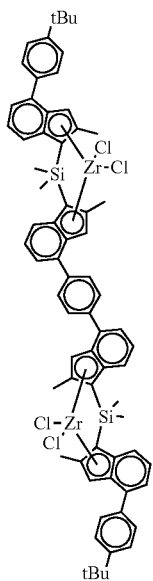
Compound E25
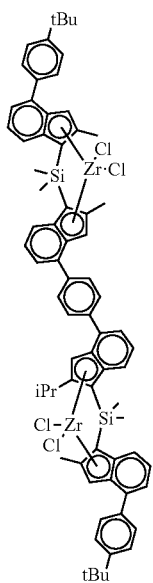

-continued
Compound E26
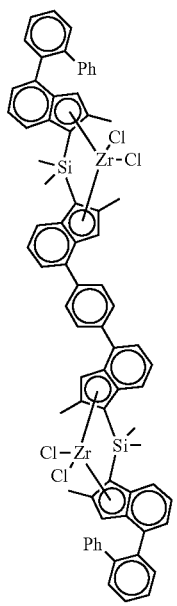
Compound E27
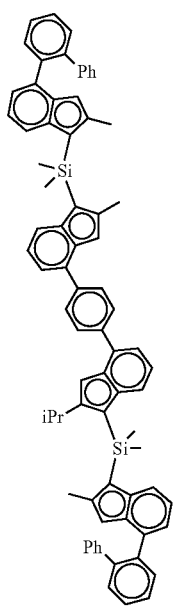
Compound E28
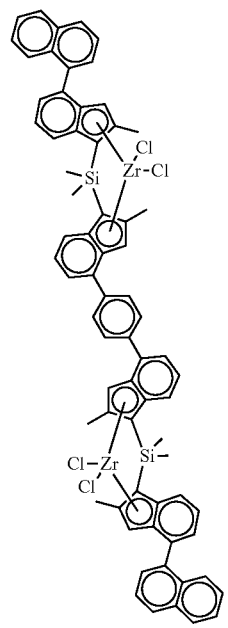
Compound E29
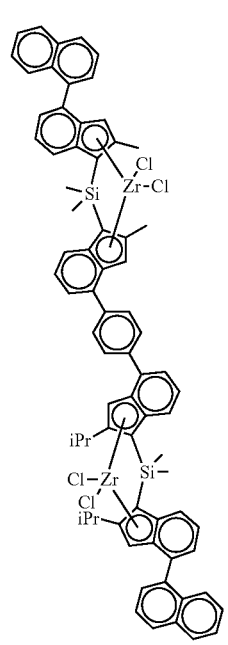

Compound E30
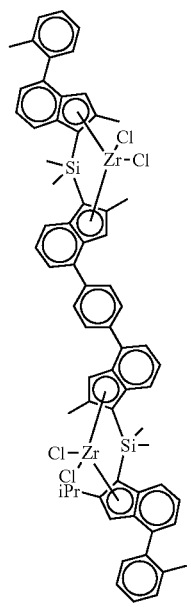
Compound E32
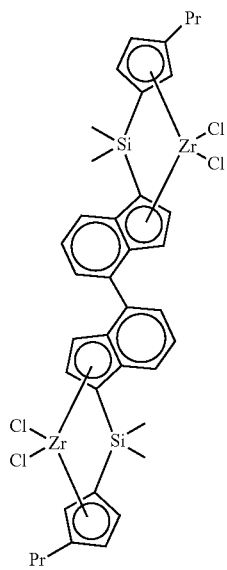
Compound E31
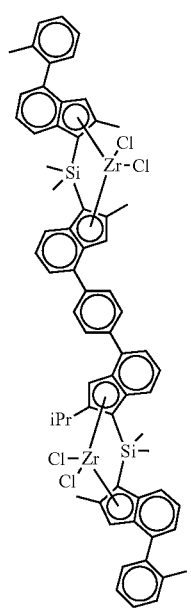
Compound E33
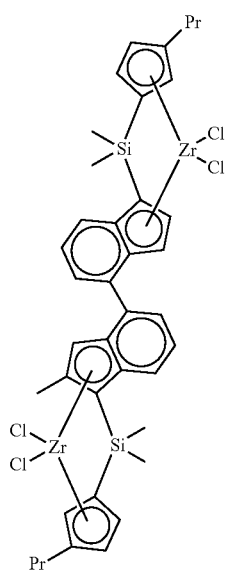

Compound E34

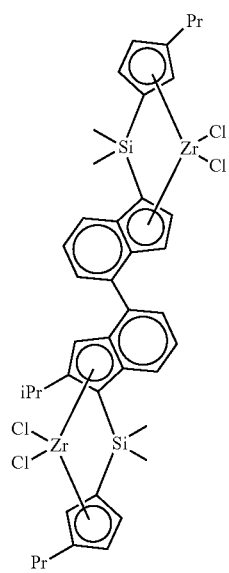

Compound E35

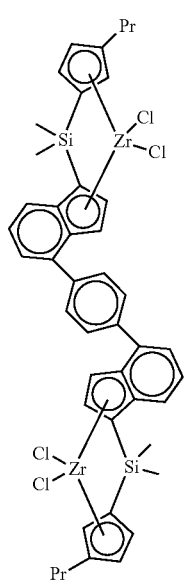

Compound E36

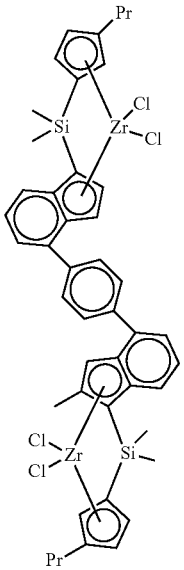

Compound E37

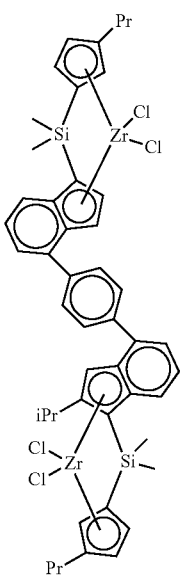

The synthesis of binuclear species (E1-E5) linked in the 4-position relies on Pd catalyzed cross-coupling involving boronic acids or pinacol boranes with 2-alkyl-4-Br indene (obtained from commercial sources). Scheme 1 below shows the general synthetic method for making compounds E1-E3. Scheme 2 shows the general synthetic method for making compounds E4 and E5.

Scheme 1
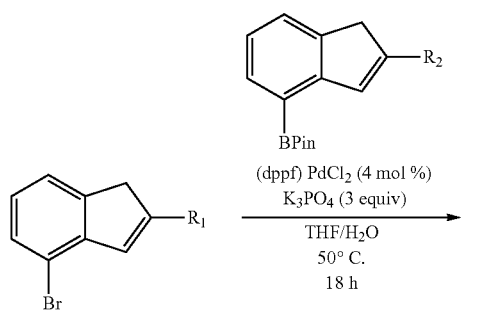
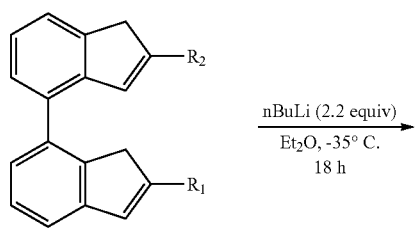
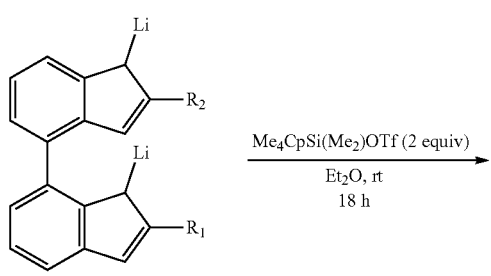
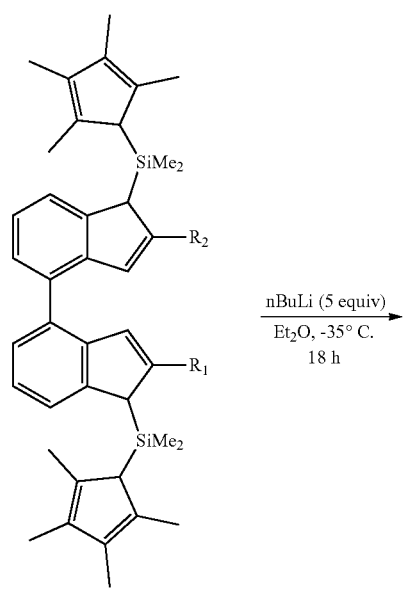
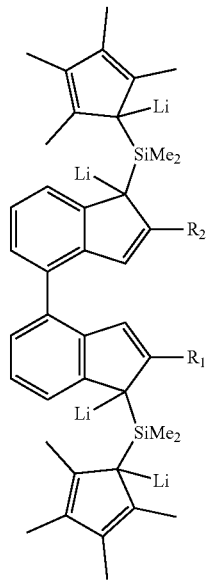
-continued
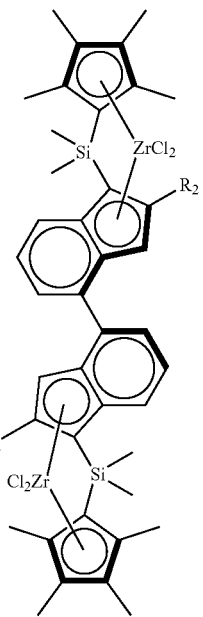
4,4' biindene compounds
R₁ = Me; R₂ = Me -E1
R₁ = Me; R₂ = iPr -E2
R₁ = iPr; R₂ = iPr -E3
Scheme 2
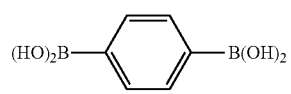

27

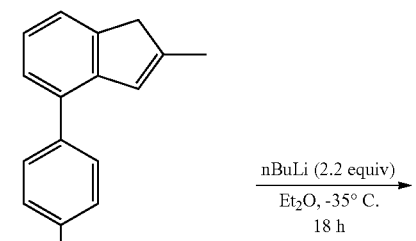

nBuLi (2.2 equiv)
————————→
Et₂O, -35° C.
18 h

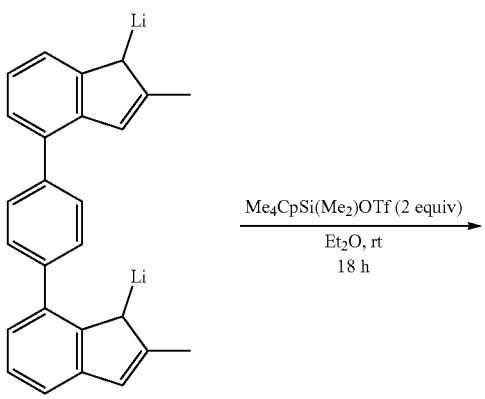

Me₄CpSi(Me₂)OTf (2 equiv)
————————————→
Et₂O, rt
18 h

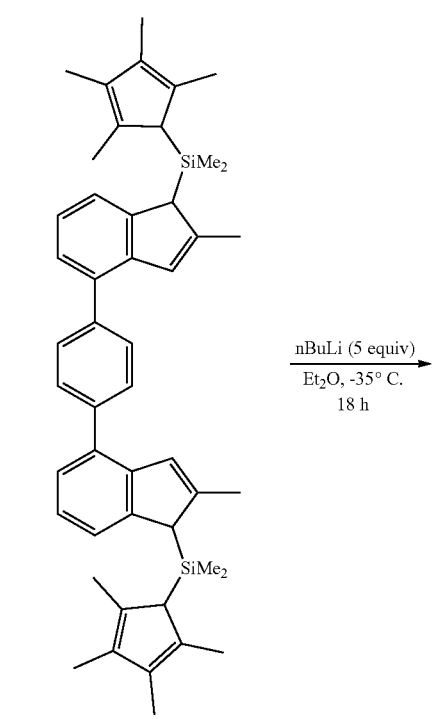

nBuLi (5 equiv)
————————→
Et₂O, -35° C.
18 h

28

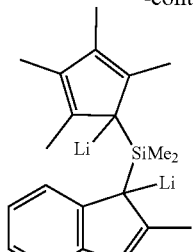

ZrCl₄ (2 equiv)
————————→
Et₂O, -35° C.
18 h

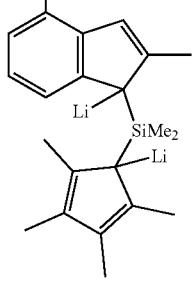

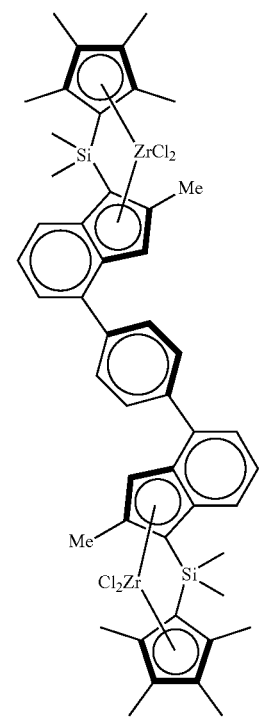

Compound E4
*Compound E5 can be prepared in analogous matter by using 1,3-aryl dibronic acid Alternatively, the two indene moieties can be linked with a long chain alkyl linker (compounds E6-E9) that can be installed using a nickel catalyzed cross-coupling chemistry by utilizing a difunctional Grignard reagent, as shown below in Scheme 3.

Scheme 3
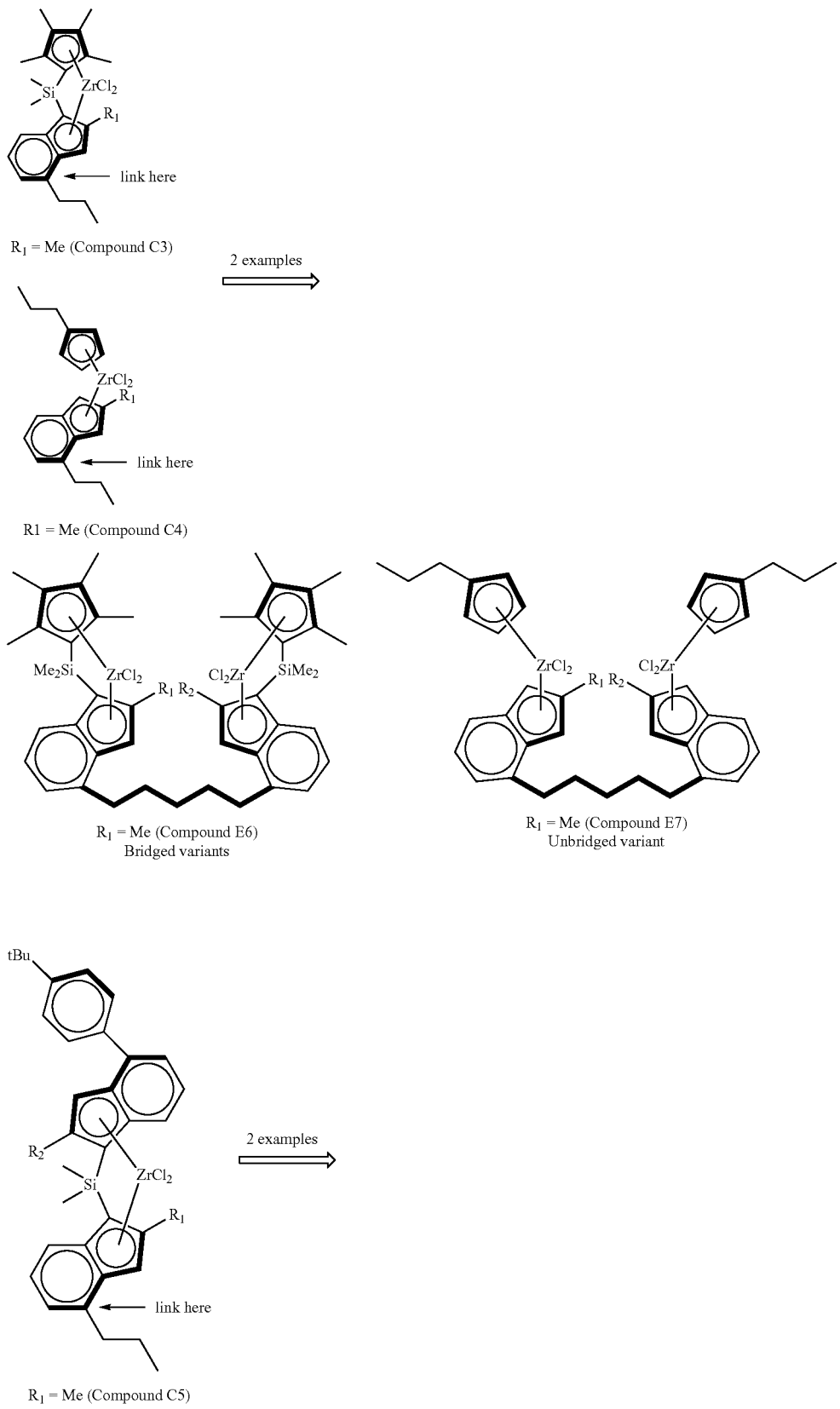

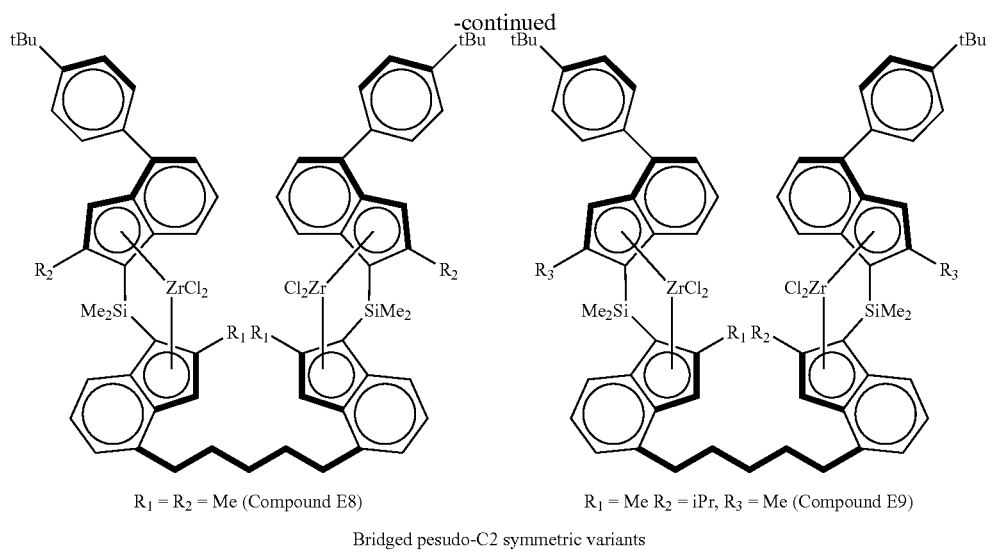
R₁ = R₂ = Me (Compound E8)
R₁ = Me R₂ = iPr, R₃ = Me (Compound E9)
Bridged pesudo-C2 symmetric variants
Scheme 3A below shows a synthetic approach using a long chain alkyl linker and synthesis of bridged metallocenes.
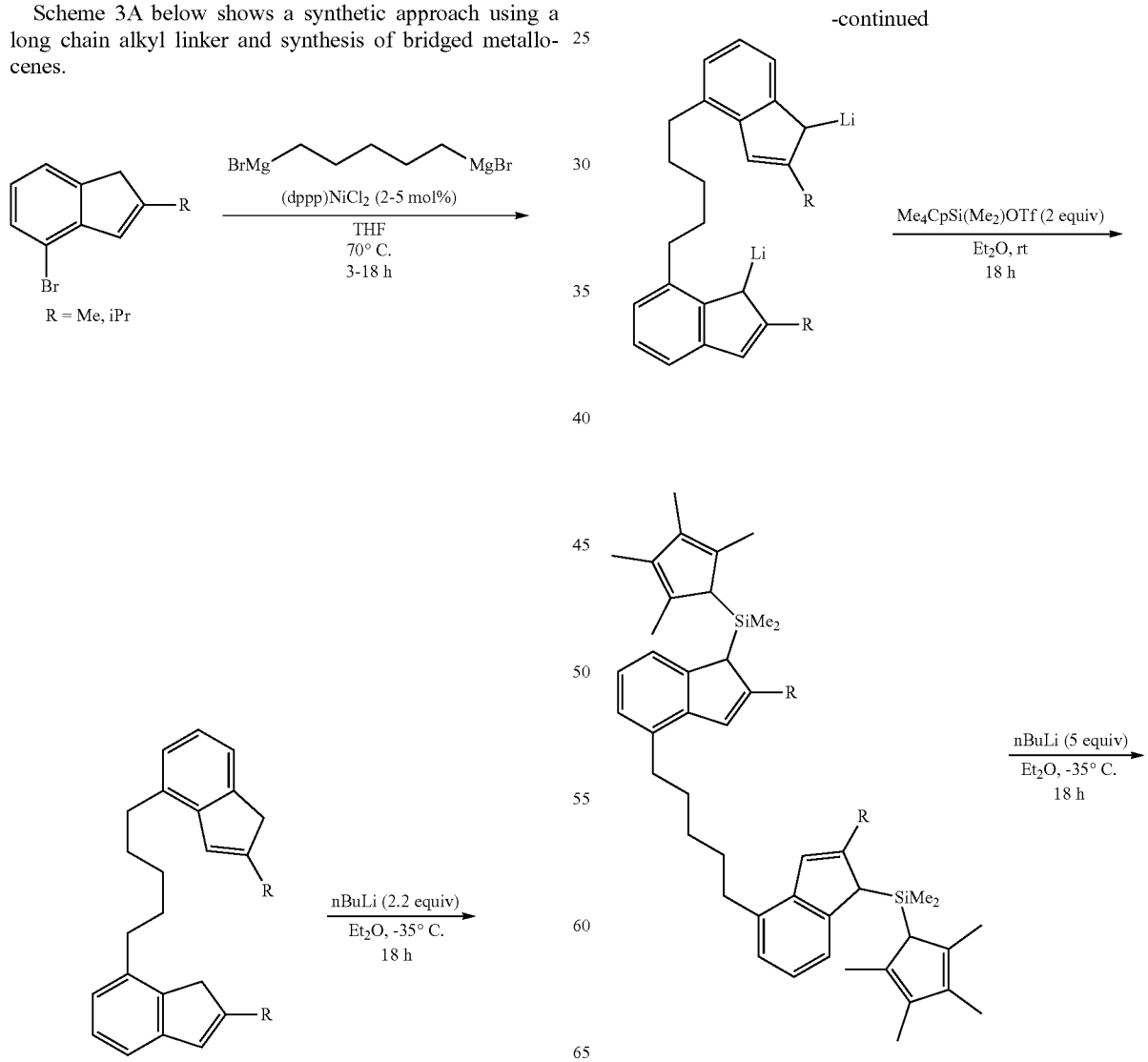

33
-continued
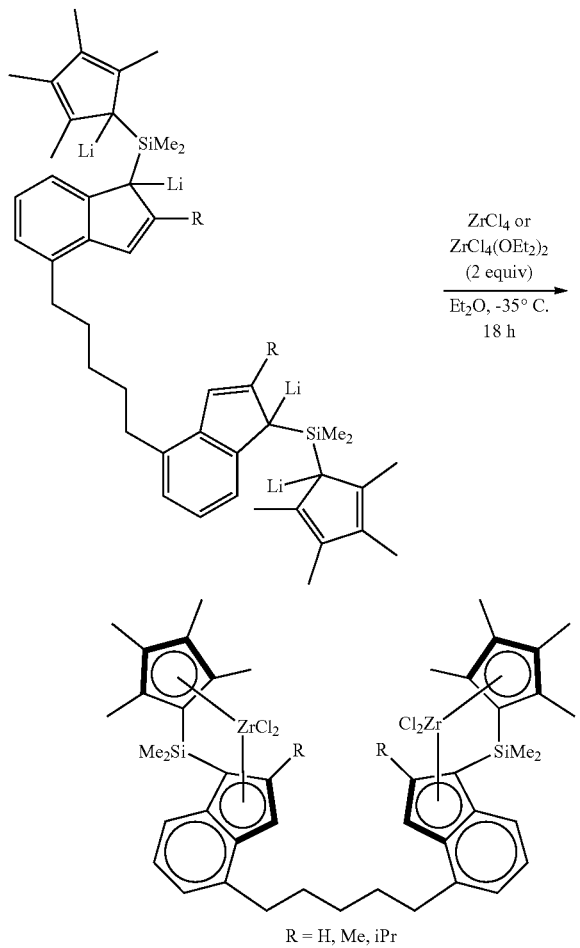
Scheme 1B below shows a general synthesis of unbridged, alkyl linked metallocenes
34
-continued
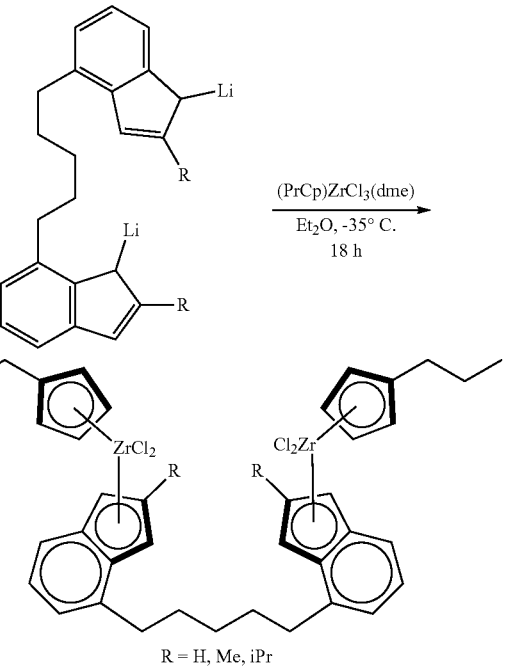
Scheme 3C below shows general synthesis of alkyl linked, pseudo-$C_2$ symmetric ansa metallocenes.
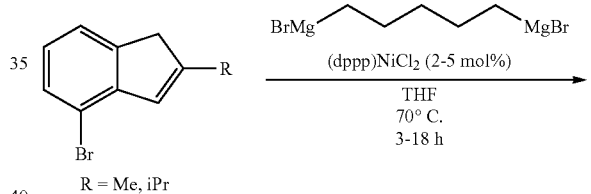
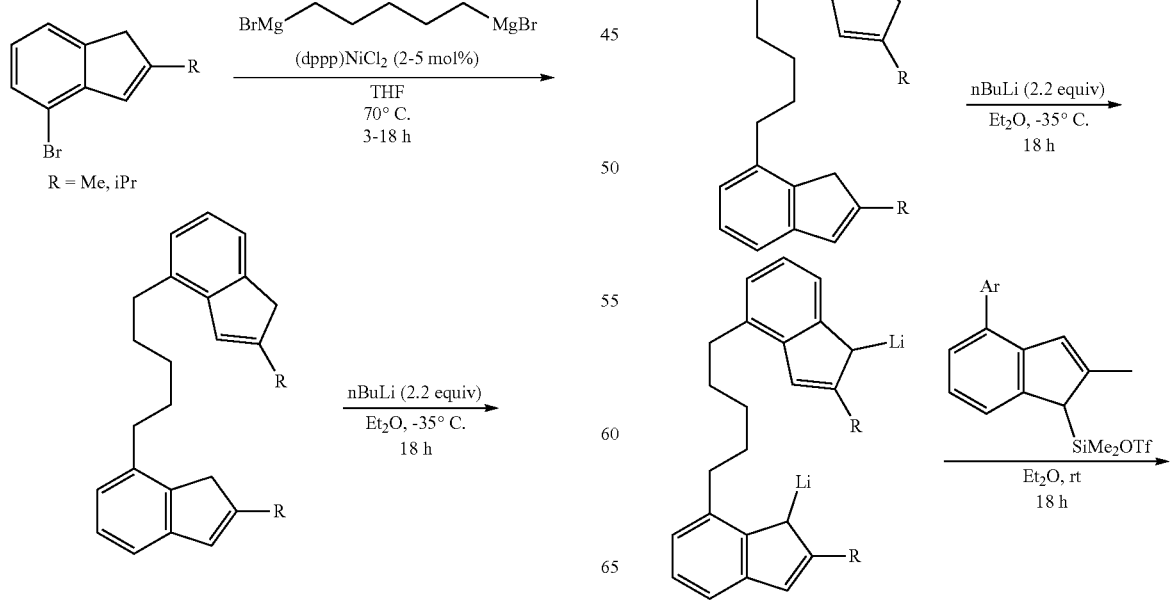

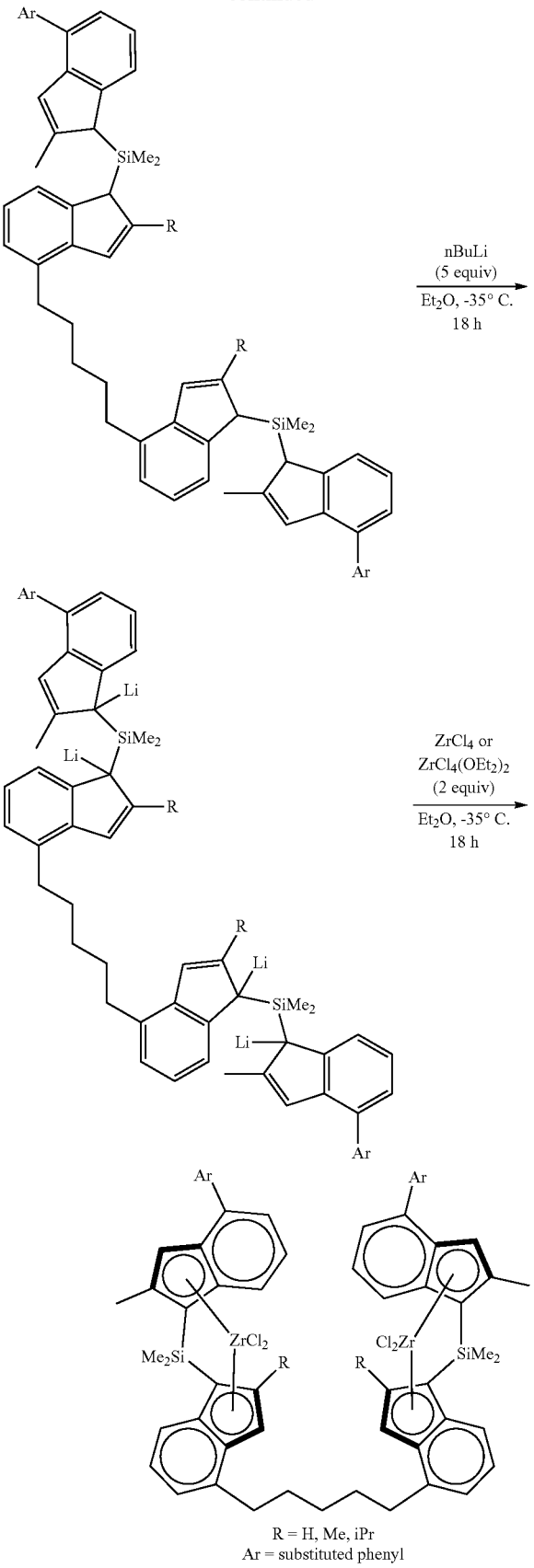

R = H, Me, iPr
Ar = substituted phenyl

It was nothing short of surprising and unexpected that linked indenyl complexes could be synthesized using the difunctionalized couplings described herein. It was also nothing short of surprising and unexpected that asymmetric linked indenyl complexes could be synthesized using the difunctionalized couplings described herein.

The binuclear metallocenes provided herein can be used with one or more conventional cocatalysts, activators, scavengers, and chain transfer agents to enhance polymerization. The binuclear metallocenes can be supported or not supported. If supported, any conventional support material can be used. The binuclear metallocene catalysts are particularly useful for olefin polymerization, such as propylene homopolymers and propylene copolymers with ethylene and/or one or more $C_4$ to $C_{40}$ olefins. Any conventional polymerization process can be used, including suspension, homogenous, bulk, slurry, solution, and gas phase polymerization processes.

EXAMPLES

The foregoing discussion can be further described with reference to the following non-limiting examples. In the examples that follow, polymerization results of homopolypropylene and ethylene-propylene copolymers produced using four comparative mononuclear catalyst complexes ($C_1$-$C_4$), and nine different 4,4'-biindene binuclear catalysts E1-E9 are provided. Complexes $C_1$-$C_2$ are known and are reported in U.S. Pat. No. 9,266,910B2. The rest are prepared according to following:

Preparation of Catalyst E1:

2-methyl-inden-4/7-yl boronic acid pinacol ester

Into a 250 mL bomb, 10.0 g 2-methyl-4-bromoindene, 13.36 g Bis(pinacolato)diboron (1.10 eq), 9.39 g potassium acetate (2.00 eq), and 1.00 g Bis (triphenylphosphine) palladium dichloride (0.030 eq) were dissolved into DMF (50 mL). The flask was sealed and heated to 110° C. Reaction stirred for 5 hours and cooled to below 70° C. Reaction was then poured into 300 mL of DI water. Product was extracted with 2×50 mL hexanes. Organic extract was then washed with 50 mL DI water and then 50 mL brine. Solvent was then removed. Crude material was purified by column chromatography (0-1% EtOAc in hexanes). Collected 8.0 g (65% yield) of product was collected as a dark red oil. $^1$H NMR ($C_6D_6$, 400 MHz) δ 7.56 (d, J=7.4 Hz, 1H), 7.35 (d, J=7.6 Hz, 1H), 7.24 (t, J=7.5 Hz, 1H), 6.49 (s, 1H), 3.51 (s, 2H), 2.19 (s, 3H), 1.37 (s, 12H) and δ 7.69 (d, J=7.4 Hz, 1H), 7.44 (d, J=7.5 Hz, 1H), 7.14-7.04 (m, 2H), 3.27 (s, 2H), 2.20 (s, 3H), 1.38 (s, 12H).

2,2'-dimethyl-4,4'-biindene

In a 200 mL bomb flask, 1.63 g 4-bromo-2-methylindene (7.8 mmol, 1 eq), 2.00 g 2-methyl-inden-4/7-yl boronic acid pinacol ester (7.8 mmol, 1 eq), 0.255 g (dppf)PdCl$_2$.(DCM) (0.3 mmol, 0.04 eq), 4.97 g K$_3$PO$_4$ (23.4 mmol, 3.0 eq), and 1 mL DI water (55.5 mmol, 7.1 eq) were dissolved into 65 mL THF. The reaction was stirred at 50° C. overnight. In the morning, the solvent was removed. The resulting solid was extracted with Et$_2$O (100 mL). The Et$_2$O solution was then washed with DI water (3×50 mL) and brine (50 mL). The Et$_2$O solution was dried with MgSO$_4$ and then filtered. Removal of solvent gave the crude product as brown solid.

The product was purified using flash column chromatography (0-2% ETOAc/Hex) to give pure product as a yellow solid. Yield: 1.8 g (89%)

2,2'-dimethyl-4,4'-biindene dilithiate

In a 20 mL scintillation vial, 0.713 g of 2,2'-dimethyl-4,4'-biindene (2.8 mmol, 1 eq) was dissolved into 20 mL $Et_2O$. 2.4 mL of 2.5 M n-BuLi (6.1 mmol, 2.2 eq) was then added dropwise. The reaction was then vigorously stirred overnight. In the morning, the $Et_2O$ was removed in vacuo. The yellow residual solid was stirred in pentane for 1 hour. The product was then isolated by filtration and washed with 2 mL pentane. The product was dried in vacuo. Yield: 0.75 g (100%) $^1$H NMR (500 MHz, THF-d8) δ 7.17 (d, J=7.9 Hz, 2H), 7.11 (d, J=6.4 Hz, 2H), 6.61-6.54 (t, J=7.4 Hz, 2H), 6.05 (d, J=2.1 Hz, 2H), 5.83 (d, J=2.3 Hz, 2H), 2.37 (s, 6H).

(2,2'-dimethyl-1H,1'H-[4,4'-biindene]-1,1'-diyl)bis(dimethyl(2,3,4,5-tetramethylcyclopenta-2,4-dien-1-yl)silane)

0.335 g 2,2'-dimethyl-4,4'-biindene dilithiate (1.24 mmol, 1 eq) and 0.814 g (2,3,4,5)cyclopentadienyldimethylsilane triflate (2.48 mmol, 2 eq) were dissolved into two separate 10 mL solutions of $Et_2O$. The lithium salt slurry was then added dropwise into the silane triflate solution. The reaction was allowed to stir overnight. In the morning, the solvent was removed. Product was extracted using dichloromethane (15 mL). Yield: 0.695 g (91%) $^1$H NMR (500 MHz, C6D6) δ 7.61-7.46 (m, 4H), 7.25 (t, J=7.5 Hz, 2H), 6.79 (s, 2H), 3.68 (d, J=6.7 Hz, 2H), 2.04 (s, 6H), 1.98 (s, 6H), 1.91 (s, 6H), 1.84 (s, 12H), −0.14 (d, J=13.3 Hz, 6H), −0.18 (d, J=8.7 Hz, 6H).

(2,2'-dimethyl-1H,1'H-[4,4'-biindene]-1,1'-diyl)bis(dimethyl(2,3,4,5-tetramethylcyclopenta-2,4-dien-1-yl)silane) tetralithiate 0.695 g (2,2'-dimethyl-1H,1'H-[4,4'-biindene]-1,1'-diyl)bis(dimethyl(2,3,4,5-tetramethylcyclopenta-2,4-dien-1-yl)silane) (1.13 mmol, 1 eq) was dissolved into 30 mL $Et_2O$. 2.26 mL of 2.5M n-BuLi (5.65 mmol, 5 eq) was then added dropwise into the solution. The solution was then stirred overnight. In the morning, the solvent was removed. The residual solid was stirred in pentane (30 mL) and filtered to isolate the product. NMR shows 100% conversion. All of this material was taken to the next step. $^1$H NMR (500 MHz, THF-d8) δ 7.52 (s, 2H), 6.91 (s, 2H), 6.53 (s, 2H), 6.05 (s, 2H), 2.39 (s, 6H), 2.18 (s, 12H), 1.95 (s, 12H), 0.66 (s, 12H).

(2,2'-dimethyl-1H,1'H-[4,4'-biindene]-1,1'-diyl)bis(dimethyl(2,3,4,5-tetramethylcyclopenta-2,4-dien-1-yl)silane) Bis(zirconium dichloride) Catalyst E1

0.146 g zirconium tetrachloride (0.626 mmol, 2 eq) was slurried into 10 mL $Et_2O$. 0.200 g (2,2'-dimethyl-1H,1'H-[4,4'-biindene]-1,1'-diyl)bis(dimethyl(2,3,4,5-tetramethylcyclopenta-2,4-dien-1-yl)silane) tetralithiate (0.313 mmol, 1 eq) was also slurried in a separate 10 mL $Et_2O$. The lithium salt was then added slowly into the $ZrCl_4$ slurry. The reaction was then stirred overnight. In the morning, the solvent was removed. The residual solid was stirred in 20 mL pentane for 1 hour, filtered, and dried. The collected solid was then stirred in 20 mL dichloromethane for 1 hour and filtered to remove LiCl. The dichloromethane was then removed to give pure product. Yield: 0.170 g (58%) $^1$H NMR (500 MHz, Methylene Chloride-d2) δ 7.66-7.58 (m, 4H), 7.24 (s, 2H), 7.09 (m, 2H), 2.29 (s, 6H), 2.06 (s, 6H), 1.94 (s, 6H), 1.93 (s, 6H), 1.86 (s, 6H), 1.23 (s, 6H), 1.11 (s, 6H).

Preparation of Catalyst E2

2-isopropyl-2'-methyl-4,4'-biindene

In a 200 mL bomb flask, 1.85 g 4-bromo-2-isopropylindene (7.8 mmol, 1 eq), 2.00 g 2-methyl-inden-4/7-yl boronic acid pinacol ester (7.8 mmol, 1 eq), 0.255 g (dppf)PdCl$_2$.(DCM) (0.3 mmol, 0.04 eq), 4.97 g $K_3PO_4$ (23.4 mmol, 3.0 eq), and 1 mL DI water (55.5 mmol, 7.1 eq) were dissolved into 65 mL THF. The reaction was stirred at 50° C. overnight. In the morning, the solvent was removed. The resulting solid was extracted with $Et_2O$ (100 mL). The $Et_2O$ solution was then washed with DI water (3×50 mL) and brine (50 mL). The Et2O solution was dried with $MgSO_4$ and then filtered. Removal of solvent gave the crude product as brown solid. The product was purified using flash column chromatography (0-2% ETOAc/Hex) to give pure product as a yellow solid. Yield: 0.942 g (42%).

2-isopropyl-2'-methyl-4,4'-biindene dilithiate

In a 20 mL scintillation vial, 0.942 g of 2-isopropyl-2'-methyl-4,4'-biindene (3.3 mmol, 1 eq) was dissolved into 20 mL $Et_2O$. 2.9 mL of 2.5M n-BuLi (7.2 mmol, 2.2 eq) was then added dropwise. The reaction was then vigorously stirred overnight. In the morning, the $Et_2O$ was removed in vacuo. The yellow residual solid was stirred in pentane for 1 hour. The product was then isolated by filtration and washed with 2 mL pentane. The product was dried in vacuo. Yield: 0.75 g (100%) $^1$H NMR (500 MHz, THF-d8) δ 7.21 (d, J=7.9 Hz, 1H), 7.17 (d, J=7.9 Hz, 1H), 7.12 (d, J=6.7 Hz, 2H), 6.58 (m, 2H), 6.12 (d, J=1.8 Hz, 1H), 6.02 (d, J=1.8 Hz, 1H), 5.91 (d, J=2.1 Hz, 1H), 5.83 (d, J=2.2 Hz, 1H), 3.06 (hept, J=6.8 Hz, 1H), 2.36 (s, 3H), 1.29 (d, J=6.8 Hz, 6H).

(2-isopropyl-2'-methyl-1H,1'H-[4,4'-biindene]-1,1'-diyl)bis(dimethyl(2,3,4,5-tetramethylcyclopenta-2,4-dien-1-yl)silane)

0.660 g 2-isopropyl-2'-methyl-4,4'-biindene dilithiate (2.21 mmol, 1 eq) and 1.451 g (2,3,4,5)cyclopentadienyldimethylsilane triflate (4.42 mmol, 2 eq) were dissolved into two separate 10 mL solutions of $Et_2O$. The lithium salt slurry was then added dropwise into the silane triflate solution. The reaction was allowed to stir overnight. In the morning, the solvent was removed. Product was extracted using dichloromethane (15 mL). The product was used without further purification. Yield: 1.2 g (88%).

(2-isopropyl-2'-methyl-1H,1'H-[4,4'-biindene]-1,1'-diyl)bis(dimethyl(2,3,4,5-tetramethylcyclopenta-2,4-dien-1-yl)silane) tetralithiate 0.695 g (2-isopropyl-2'-methyl-1H,1'H-[4,4'-biindene]-1,1'-diyl)bis(dimethyl(2,3,4,5-tetramethylcyclopenta-2,4-dien-1-yl)silane) (1.13 mmol, 1 eq) was dissolved into 30 mL $Et_2O$. 2.26 mL of 2.5M n-BuLi (5.65 mmol, 5 eq) was then added dropwise into the solution. The solution was then stirred overnight. In the morning, the solvent was removed. The residual solid was stirred in pentane (30 mL) and filtered to isolate the product. NMR shows 100% conversion. All of this material was taken to the next step.

(2-isopropyl-2'-methyl-1H,1'H-[4,4'-biindene]-1,1'-diyl)bis(dimethyl (2,3,4,5-tetramethylcyclopenta-2,4-dien-1-yl) silane) Bis(zirconium dichloride) Catalyst E2

0.229 g zirconium tetrachloride (0.98 mmol, 2 eq) was slurried into 10 mL Et$_2$O. 0.400 g (2-isopropyl-2'-methyl-1H,1'H-[4,4'-biindene]-1,1'-diyl)bis(dimethyl(2,3,4,5-tetramethylcyclopenta-2,4-dien-1-yl)silane) tetralithiate (0.49 mmol, 1 eq) was also slurried in a separate 10 mL Et$_2$O. The lithium salt was then added slowly into the ZrCl$_4$ slurry. The reaction was then stirred overnight. In the morning, the solvent was removed. The residual solid was stirred in 20 mL pentane for 1 hour, filtered, and dried. The collected solid was then stirred in 20 mL dichloromethane for 1 hour and filtered to remove LiCl. The dichloromethane was then removed. The resulting solid was then dissolved into minimal dichloromethane. Diethyl ether was then diffused into it using a diffusion chamber overnight. This solution was then cooled to −35° C. The DCM/Et$_2$O solution was decanted off and the precipitate was dried to give pure product. Yield: 0.050 g (10%) $^1$H NMR (400 MHz, Methylene Chloride-d2) δ 7.67-7.60 (m, 4H), 7.13-7.06 (m, 2H), 6.74 (s, 1H), 6.67 (s, 1H), 3.04 (hept, J=6.5 Hz, 1H), 2.24 (s, 3H), 2.05 (s, 3H), 1.98 (s, 3H), 1.95 (s, 3H), 1.94 (s, 3H), 1.93 (s, 3H), 1.91 (s, 3H), 1.88 (s, 3H), 1.87 (s, 3H), 1.23 (d, J=2.1 Hz, 6H), 1.21 (d, J=6.6 Hz, 3H), 1.12 (d, J=6.8 Hz, 3H), 1.11 (d, J=7.4 Hz, 6H).

Preparation of Catalyst E3

2-isopropyl-inden-4/7-yl boronic acid pinacol ester

Into a 250 mL bomb, 10.0 g 2-isopropyl-4-bromoindene, 11.78 g Bis(pinacolato)diboron (1.10 eq), 8.277 g potassium acetate (2.00 eq), and 0.888 g Bis(triphenylphosphine)palladium dichloride (0.030 eq) were dissolved into DMF (50 mL). The flask was sealed and heated to 110° C. Reaction stirred for 5 hours and cooled to below 70° C. Reaction was then poured into 300 mL of DI water. Product was extracted with 2×50 mL hexanes. Organic extract was then washed with 50 mL DI water and then 50 mL brine. Solvent was then removed. Crude material was purified by column chromatography (0-2% EtOAc in hexanes). Collected 7.5 g (60% yield) of product was collected as a yellow solid. $^1$H NMR for both isomers (C$_6$D$_6$, 400 MHz) δ 8.25-8.19 (m, 1H), 8.06 (dd, J=7.4, 1.3 Hz, 1H), 7.55 (m, 1H), 7.41-7.32 (m, 2H), 7.30 (m, 1H), 7.16 (t, J=7.4 Hz, 1H), 6.44 (q, J=1.5 Hz, 1H), 3.72 (m, 2H), 3.0 (m, 2H), 2.58 (m, 2H), 1.14 (s, 12H), 1.14 (s, 12H), 1.08 (d, J=4.0 Hz, 6H), 1.06 (d, J=4.0 Hz, 6H).

2,2'-diisopropyl-4,4'-biindene

In a 200 mL bomb flask, 1.63 g 4-bromo-2-isopropylindene (7.8 mmol, 1 eq), 2.00 g 2-isopropyl-inden-4/7-yl boronic acid pinacol ester (7.8 mmol, 1 eq), 0.255 g (dppf) PdCl$_2$.(DCM) (0.3 mmol, 0.04 eq), 4.97 g K$_3$PO$_4$ (23.4 mmol, 3.0 eq), and 1 mL DI water (55.5 mmol, 7.1 eq) were dissolved into 65 mL THF. The reaction was stirred at 50° C. overnight. In the morning, the solvent was removed. The resulting solid was extracted with Et$_2$O (100 mL). The Et$_2$O solution was then washed with DI water (3×50 mL) and brine (50 mL). The Et2O solution was dried with MgSO$_4$ and then filtered. Removal of solvent gave the crude product as brown solid. The product was purified using flash column chromatography (0-2% ETOAc/Hex) to give pure product as a yellow solid. Yield: 1.6 g (72%).

2,2'-diisopropyl-4,4'-biindene dilithiate

In a 20 mL scintillation vial, 0.800 g of 2,2'-diisopropyl-4,4'-biindene (3 mmol, 1 eq) was dissolved into 20 mL Et$_2$O. 2.2 mL of 2.5M n-BuLi (6 mmol, 2.2 eq) was then added dropwise. The reaction was then vigorously stirred overnight. In the morning, the Et$_2$O was removed in vacuo. The yellow residual solid was stirred in pentane for 1 hour. The product was then isolated by filtration and washed with 2 mL pentane. The product was dried in vacuo. Yield: 0.83 g (100%) $^1$H NMR (400 MHz, THF-d8) δ 7.22 (dt, J=7.9, 1.0 Hz, 1H), 7.13 (dd, J=6.8, 1.1 Hz, 1H), 6.59 (dd, J=7.9, 6.8 Hz, 1H), 6.13 (d, J=2.1 Hz, 1H), 5.93 (d, J=2.2 Hz, 1H), 3.06 (h, J=6.8 Hz, 1H), 1.30 (d, J=6.8 Hz, 6H).

(2,2'-diisopropyl-1H,1'H-[4,4'-biindene]-1,1'-diyl)bis(dimethyl(2,3,4,5-tetramethylcyclopenta-2,4-dien-1-yl)silane)

0.400 g 2,2'-diisopropyl-4,4'-biindene dilithiate (1.18 mmol, 1 eq) and 0.779 g (2,3,4,5)cyclopentadienyldimethylsilane triflate (2.37 mmol, 2 eq) were dissolved into two separate 10 mL solutions of Et$_2$O. The lithium salt slurry was then added dropwise into the silane triflate solution. The reaction was allowed to stir overnight. In the morning, the solvent was removed. Product was extracted using dichloromethane (15 mL). Yield: 0.802 g (100%). Product used without further purification.

(2,2'-diisopropyl-1H,1'H-[4,4'-biindene]-1,1'-diyl)bis(dimethyl(2,3,4,5-tetramethylcyclopenta-2,4-dien-1-yl)silane) tetralithiate 0.800 g (2,2'-diisopropyl-1H,1'H-[4,4'-biindene]-1,1'-diyl)bis(dimethyl(2,3,4,5-tetramethylcyclopenta-2,4-dien-1-yl)silane) (1.19 mmol, 1 eq) was dissolved into 30 mL Et$_2$O. 2.38 mL of 2.5M n-BuLi (5.96 mmol, 5 eq) was then added dropwise into the solution. The solution was then stirred overnight. In the morning, the solvent was removed. The residual solid was stirred in pentane (30 mL) and filtered to isolate the product. NMR shows 100% conversion. All of this material was taken to the next step.

(2,2'-diisopropyl-1H,1'H-[4,4'-biindene]-1,1'-diyl)bis(dimethyl(2,3,4,5-tetramethylcyclopenta-2,4-dien-1-yl)silane) Bis(zirconium dichloride) Catalyst E3

0.555 g zirconium tetrachloride (2.38 mmol, 2 eq) was slurried into 20 mL Et$_2$O. 0.828 g (2,2'-diisopropyl-1H,1'H-[4,4'-biindene]-1,1'-diyl)bis(dimethyl(2,3,4,5-tetramethylcyclopenta-2,4-dien-1-yl)silane) tetralithiate (1.19 mmol, 1 eq) was also slurried in a separate 20 mL Et$_2$O. The lithium salt was then added slowly into the ZrCl$_4$ slurry. The reaction was then stirred overnight. In the morning, the solvent was removed. The residual solid was stirred in 50 mL pentane for 1 hour, filtered, and dried. The collected solid was then stirred in 50 mL dichloromethane for 1 hour and filtered to remove LiCl. The dichloromethane was then removed. 100 mg was then dissolved into ~1.5 mL dicholoromethane placed into a vapor diffusion chamber with Et$_2$O. After leaving overnight, the chamber was placed into the freezer at −35° C. overnight. In the morning, the solution was decanted. The precipitate was then dried to give pure product. Yield: 0.050 g (4%) $^1$H NMR (400 MHz, Methylene Chloride-d2) δ 7.65 (dd, J=28.3, 7.8 Hz, 2H), 7.13 (dd, J=8.7, 6.9 Hz, 1H), 6.72 (s, 1H), 3.09 (h, J=6.7 Hz, 1H), 2.01

(s, 3H), 1.96 (s, 3H), 1.96 (s, 3H), 1.91 (s, 3H), 1.28 (s, 3H), 1.25 (d, J=6.6 Hz, 3H), 1.20 (d, eH), 1.17 (s, 3H).
Preparation of Catalyst E4:

1,4-bis(2-methyl-1H-inden-4-yl)benzene

In a 200 mL bomb flask, 2.78 g 4-bromo-2-methylindene (13.3 mmol, 2.2 eq), 1,4), 1.0 g benzene-1,4-diboronic acid (6.0 mmol, 1 eq), 0.138 g Pd(dba)$_2$ (0.15 mmol, 0.025 eq), 0.106 g 1,3,5,7-Tetramethyl-6-phenyl-2,4,8-trioxa-6-phosphaadamantane (0.36 mmol, 0.060 eq), and 5.635 g K$_3$PO$_4$ (26.6 mmol, 4.4 eq) were dissolved into 62.5 mL THF and 12.5 mL DI H$_2$O. The reaction was stirred at 75° C. overnight. In the morning, the THF was removed. The resulting solid was extracted with Et$_2$O (100 mL). The Et$_2$O solution was then washed with DI water (3×50 mL) and brine (50 mL). The Et$_2$O solution was dried with MgSO$_4$ and then filtered. Removal of solvent gave the crude product as brown solid. The impurities were washed out using acetone. The remaining off-white solid pure product. $^1$H NMR (500 MHz, Chloroform-d) δ 7.62 (s, 4H), 7.34 (t, J=7.5 Hz, 2H), 7.28 (dd, J=7.4, 1.1 Hz, 2H), 7.21 (dd, J=7.5, 1.1 Hz, 2H), 6.57 (q, J=1.6 Hz, 2H), 3.47 (s, 4H), 2.17 (s, 6H).

1,4-bis(2-methyl-inden-4-yl)benzene dilithiate

In a 20 mL scintillation vial, 0.400 g 1,4-bis(2-methyl-1H-inden-4-yl)benzene (1.2 mmol, 1 eq) was dissolved into 20 mL Et$_2$O. 1.05 mL of 2.5M n-BuLi (2.6 mmol, 2.2 eq) was then added dropwise. The reaction was then vigorously stirred overnight. In the morning, the Et$_2$O was removed in vacuo. The orange residual solid was stirred in pentane for 1 hour. The product was then isolated by filtration and washed with 2 mL pentane. The product was dried in vacuo. Yield: 0.48 g (100%) $^1$H NMR (400 MHz, THF-d8) δ 7.85 (s, 4H), 7.23 (d, J=7.8 Hz, 2H), 6.67-6.64 (m, 2H), 6.56 (m, 2H), 6.18 (m, 2H), 5.89 (m, 2H), 2.44 (s, 6H).

1,4-bis(1-(dimethyl(2,3,4,5-tetramethylcyclopenta-2,4-dien-1-yl)silyl)-2-methyl-1H-inden-4-yl)benzene 0.215 g 1,4-bis(2-methyl-inden-4-yl)benzene dilithiate (0.622 mmol, 1 eq) and 0.409 g (2,3,4,5)cyclopentadienyldimethylsilane triflate (1.244 mmol, 2 eq) were dissolved into two separate 10 mL solutions of Et$_2$O. The lithium salt slurry was then added dropwise into the silane triflate solution. The reaction was allowed to stir overnight. In the morning, the solvent was removed. Product was extracted using dichloromethane (15 mL). Yield: 0.410 g (95%) $^1$H NMR (400 MHz, C6D6) δ 7.76 (d, J=1.1 Hz, 4H), 7.47 (m, 4H), 7.23 (t, J=7.6 Hz, 2H), 7.01 (m, 2H), 2.05 (s, 6H), 1.96 (s, 6H), 1.90 (s, 6H), 1.83 (s, 12H), −0.18 (s, 6H), −0.20 (s, 6H).

1,4-bis(1-(dimethyl(2,3,4,5-tetramethylcyclopenta-2,4-dien-1-yl)silyl)-2-methyl-inden-4-yl)benzene tetralithiate 0.205 g 1,4-bis(1-(dimethyl(2,3,4,5-tetramethylcyclopenta-2,4-dien-1-yl)silyl)-2-methyl-1H-inden-4-yl)benzene (0.297 mmol, 1 eq) was dissolved into 20 mL Et$_2$O. 0.593 mL of 2.5M n-BuLi (1.48 mmol, 5 eq) was then added dropwise into the solution. The solution was then stirred overnight. In the morning, the solvent was removed. The residual solid was stirred in pentane (20 mL) and filtered to isolate the product. NMR shows 100% conversion. All of this material was taken to the next step. $^1$H NMR (400 MHz, THF-d8) δ 7.75 (s, 4H), 7.56 (b, 2H), 6.59 (b, 2H), 6.54 (m, 2H), 6.25 (s, 2H), 2.49 (s, 6H), 2.18 (s, 12H), 1.94 (s, 12H), 0.67 (s, 12H).

1,4-bis(1-(dimethyl(2,3,4,5-tetramethylcyclopenta-2,4-dien-1-yl)silyl)-2-methyl-inden-4-yl)benzene Bis (zirconium dichloride) Catalyst E4

0.138 g zirconium tetrachloride (0.593 mmol, 2 eq) was slurried into 10 mL Et$_2$O. 0.212 g 1,4-bis(1-(dimethyl(2,3,4,5-tetramethylcyclopenta-2,4-dien-1-yl)silyl)-2-methyl-inden-4-yl)benzene tetralithiate (0.297 mmol, 1 eq) was also slurried in a separate 10 mL Et$_2$O. The lithium salt was then added slowly into the ZrCl$_4$ slurry. The reaction was then stirred overnight. In the morning, the solvent was removed. The residual solid was stirred in 20 mL pentane for 1 hour, filtered, and dried. The collected solid was then stirred in 20 mL dichloromethane for 1 hour and filtered to remove LiCl. The dichloromethane was then removed to give pure product. Yield: 0.100 g (33%) $^1$H NMR (400 MHz, Methylene Chloride-d2) δ 7.79 (s, 4H), 7.61 (d, J=8.6 Hz, 2H), 7.36 (d, J=6.8 Hz, 2H), 7.14 (s, 2H), 7.08 (dd, J=8.7, 6.9 Hz, 2H), 2.31 (s, 6H), 2.09 (s, 6H), 1.98 (s, 6H), 1.92 (s, 6H), 1.88 (s, 6H), 1.23 (s, 6H), 1.12 (s, 6H).

Preparation of Catalyst E6 (Alkyl Linked Bis-Indene Complex):

(2-methyl-7-(5-(2-methyl-1H-inden-4-yl)pentyl)-1H-indene) To a stirred ether solution of (dppp)NiCl$_2$ (0.259 g) and 2-Me-4-Br-indene (2.0 g, was dropwise added bromo-[5-(bromomagnesio)pentyl]magnesium (9.57 mL of 0.5M solution); Grignard solution at room temperature. The reaction was then heated to gentle reflux at 42° C. The reaction was heated overnight. The reaction was quenched with water and acidified with 10% HCl. The organic layer was separated and aqueous layer was extracted with diethyl ether (2×20 mL). The combined organic extracts were washed with sat. sodium bicarbonate (2×20 mL), water (2×20 mL) and brine (1×20 mL), and were dried over MgSO4 and filtered through celite. The mixture was then concentrated under vacuum and the residue was chromatographed (5% EtOAc/Hexane) to give a final product (1.29 g, 82% yield) $^1$H NMR (C6D6) 7.24 (m, 2H) 7.17 (m, 2H), 6.99 (m, 1H) 6.41 (s, 1H) 2.90 (s, 4H) 2.54 (m, 4H) 1.90 (s, 6H), 1.62 (m, 4H) 2.09 (m, 2H).

Dilithium-(2-methyl-7-(5-(2-methyl-1H-inden-4-yl)pentyl)-indenyl) The crystalline indene (1.29 g) material was dissolved in diethylether and cooled to −35° C. in the glovebox freezer. nBuLi (3.17 mL of 2.5M solution) was then slowly added to the solution of indene. The reaction mixture briefly turned green and almost immediately started to precipitate white solids. The mixture was allowed to warm up to room temperature and was stirred overnight. After 18 hours, solvent was removed in vacuo, and the resulting yellow residue was suspended in 30 mL of hexane, filtered and washed with additional 15 mL of hexane. $^1$H NMR indicated clean product formation (1.15 g) in 86% yield. Depending on conditions, the compound may contain bound diethylether. $^1$H NMR (C$_6$D$_6$/THF-d8) 7.51 (m, 2H) 6.86 (m, 2H), 6.76 (m, 2H) 6.15 (s, 4H) 3.09 (m, 4H) 2.54 (s, 6H) 2.09 (m, 4H), 1.78 (m, 2H).

1,5-bis(1-(dimethyl(2,3,4,5-tetramethylcyclopenta-2,4-dien-1-yl)silyl)-2-methyl-1H-inden-4-yl)pentane To an ether slurry of dilithium bis-indacene prepared in the previous step (0.306 g) was slowly added Me4CpSiMe2OTf (0.591 g) as an ether solution. The initially heterogenous mixture became pale yellow and clear after 15 minutes. It was stirred overnight at room temperature. After 18 hours, the mixture was concentrated in vacuo. The residue was extracted with pentane (20 mL), filtered and concentrated in vacuo to give a thick yellow oil (0.61 g, 86% yield) which was spectroscopically pure. $^1$H NMR (C$_6$D$_6$) 7.35 (m, 2H) 7.11 (m, 4H), 6.74 (m, 2H) 3.60 (s, 2H) 3.19 (s, 2H) 2.79 (m, 4H) 2.11 (s, 6H) 1.95 (s, 6H) 1.87 (s, 6H) 1.81 (s, 6H) 1.75 (s, 6H) 1.85-1.75 (overlapping m, 6H) −0.25 (s, 12H).

1,5-bis(1-(dimethyl(2,3,4,5-tetramethylcyclopenta-2,4-dien-1-yl)silyl)-2-methyl-inden-4-yl)pentane tetralithiate nBuLi (1.42 mL of 2.5M) was added to the stirred solution of ligand prepared in the previous step (0.61 g) in diethyl ether at −30° C. Upon addition, white solids began to precipitate. The reaction mixture was warmed up to room temperature and was stirred for 22 hours. After 22 hours, the mixture was and the residue was suspended in hexane and filtered. The resulting off-white solid was washed with additional hexane and dried in vacuo. $^1$H NMR analysis indicated desired tetralithiated product (0.81 g, 76% yield) formation with—ca 2 equiv. of diethyl ether and 1 equiv. of hexane. $^1$H NMR (C$_6$D$_6$/THF-d8) 7.68 (m, 2H) 6.63-6.65 (m, 4H), 6.10 (m, 2H) 2.93 (m, 4H) 2.57 (m, 6H) 2.32 (m, 12H) 2.08 (m, 12H) 1.95 (m, 4H) 1.66 (m, 2H) 0.80 (s, 12H).

1,5-bis(1-(dimethyl(2,3,4,5-tetramethylcyclopenta-2,4-dien-1-yl)silyl)-2-methyl-inden-4-yl)pentane-bis(dichlorozirconium) Compound E6. ZrCl$_4$(OEt$_2$)$_2$ (0.51 g) was slowly added to an ether slurry of 1,5-bis(1-(dimethyl(2,3,4,5-tetramethylcyclopenta-2,4-dien-1-yl)silyl)-2-methyl-inden-4-yl)pentane tetralithiate.2Et$_2$O·C$_5$H$_{12}$ prepared in the previous step (0.625 g) at −35° C. The mixture slowly turned yellow upon warming up. It was stirred for 3 hours, before an aliquot was removed, concentrated, extracted with methylene chloride and filtered and concentrated again. $^1$H NMR of the aliquot indicates clean product formation. The bulk sample was concentrated in vacuo, and the resulting yellow powder was extracted with methylene chloride, filtered and concentrated. Hexane was added, the mixture was briefly stirred until all solids precipitated and filtered. The solid was washed with hexane (20 mL) and dried in vacuo to give a desired metallocene as yellow powder in 52% yield. $^1$H NMR (Methylene Chloride-d$_2$) δ 7.43 (d, 2H), 7.19-6.99 (m, 2H), 6.99-6.77 (m, 4H), 2.76 (m, 4H), 2.30 (s, 6H), 2.05 (s, 6H), 1.94 (s, 6H), 1.91-1.72 (overlapping m, 16H), 1.61-1.49 (m, 2H), 1.18 (s, 3H), 1.09 (s, 3H).

Preparation of Compound E7 (Unbridged Variant)

(2-methyl-7-(5-(2-methyl-1H-inden-4-yl)pentyl)-1H-indenyl)(bis(nPropyl-cyclopentadienyl)dichlorozirconium). (nPrCp)ZrCl$_3$(dme) (0.499 g) was added as a solid to a cold stirred mixture of dilithium-(2-methyl-7-(5-(2-methyl-1H-inden-4-yl)pentyl)-1H-indenyl) (0.215 g) in diethyl ether. Almost instantly the reaction became yellow with thick precipitate. It was allowed to stir at room temperature for 5 hours. After 5 hours, solvent was removed in vacuo, and the residue was extracted with methylene chloride (20 mL) and filtered through celite. Solvent removal afforded yellow powder, which was suspended in hexane, filtered and washed with additional hexane. The desired compound was obtained in 82% yield as a yellow powder. $^1$H NMR (C$_6$D$_6$) δ 7.04 (d, 2H), 6.95-6.77 (m, 4H), 6.47-6.32 (m, 2H), 5.81 (m, 2H), 5.68 (m, 4H), 5.50-5.33 (m, 4H), 2.99 (m, 2H), 2.81 (m, 2H), 2.55 (m, 4H), 2.23 (s, 6H), 1.83-1.58 (m, 4H), 1.50-1.33 (m, 6H), 0.77 (t, 6H).

Preparation of Comparative Compound C3

2-Me-4-propyl-1H-indene A diethyether solution of propyl magnesium bromide (5.26 mL, 2.0M) was added to a stirred mixture of (dppp)NiCl$_2$(0.259 g) and 2-Me-4-Br indene (2.0 g) in diethyl ether. The mixture was then heated to reflux overnight. After 18 hours, the solution was quenched with water and diluted with 10% HCl solution. The organic layer was separated, and the aqueous layer was extracted with diethylether (2×20 mL). The combined organic extracts were washed with sodium bicarbonate (2×20 mL), water (3×20 mL) and brine (1×20 mL). The solution was then dried over anhydrous MgSO4 and filtered to give a pure product in 90% yield. $^1$H NMR (Benzene-d$_6$) δ 7.23 (m, 1H), 7.15 (m, 1H) 7.00-6.89 (m, 1H), 6.40 (m, 1H), 2.92-2.81 (m, 2H), 2.50 (m, 2H), 1.88 (m, 3H), 1.68-1.52 (m, 2H), 0.89 (t, 3H).

Lithium-2-Me-4-propyl-indenyl nBuLi (3.81 mL, 2.5M in hexane) was slowly added to a stirring mixture of 2-Me-4-Propyl indene in hexane/ether (5:1). The mixture almost instantly became thick and after 5 minutes, white solid formed. At this point the reaction did not stir, so additional hexane was added. The mixture was stirred for 30 minutes and filtered, and the solid was washed with additional hexane and dried in vacuo. Very pure lithiated product was obtained in quantitative yield. $^1$H NMR (Benzene-d$_6$) δ 7.51 (m, 1H), 6.86 (m, 1H), 6.71 (m, 1H), 6.25-6.05 (m, 2H), 3.00 (m, 2H), 2.55 (s, 3H), 1.97 (m, 2H), 1.21-0.98 (t, 3H).

dimethyl(2-methyl-4-propyl-1H-inden-1-yl)(2,3,4,5-tetramethylcyclopenta-2,4-dien-1-yl)silane To an ether slurry of lithium-2-Me-4-Pr-indenyl (0.273 g) was slowly added Me$_4$CpSiMe$_2$OTf (0.493 g) as an ether solution. The initially heterogenous mixture became pale yellow and clear after 15 minutes. It was stirred over the weekend at room temperature. After 18 hours, the mixture was concentrated in vacuo. The residue was extracted with pentane (20 mL), filtered and concentrated in vacuo to give a thick yellow oil (0.513 g, 98% yield) which was spectroscopically pure $^1$H NMR (400 MHz, Benzene-d$_6$) δ 7.35 (m, 1H), 7.13-7.05 (m, 2H), 6.70 (m, 1H), 3.59 (s, 1H), 3.19 (s, 1H), 2.83-2.69 (m, 2H), 2.09 (s, 3H), 1.94 (s, 3H), 1.86 (s, 3H), 1.81 (s, 6H), 1.75-1.64 (m, 2H), 0.94 (t, 3H), −0.26 (s, 6H).

dimethyl(2-methyl-4-propyl-inden-1-yl)(2,3,4,5-tetramethylcyclopenta-2,4-dien-1-yl)silane(bis-zirconium dichloride) Compound C3. nBuLi (1.18 mL, 2.5 M) was added to a pre-cooled (−35° C.) solution of ligand (0.513 g) prepared in the previous step in diethylether. No obvious color change was observed initially, but the mixture became orange upon warming up. The mixture was stirred at room temperature for 5 hours, before being placed in a freezer again. While cold, ZrCl$_4$(OEt$_2$)$_2$ (0.558 g) was then slowly added to an ether slurry of in-situ lithiated ligand at −35° C. The mixture slowly became yellow upon warming up. It was stirred for 18 hours at room temperature. The bulk sample was then concentrated in vacuo, and the resulting yellow powder was extracted with methylene chloride, filtered and concentrated. Hexane was added, the mixture was briefly stirred until all solids precipitated and filtered. The solid was washed with hexane (20 mL) and dried in vacuo to give a final product (0.400 g) in 53% yield. $^1$H NMR (Methylene Chloride-d$_2$) δ 7.48 (m, 1H), 7.09 (m, 1H), 6.97-6.92 (m, 2H), 2.85-2.69 (m, 2H), 2.34 (s, 3H), 2.09 (s, 3H), 1.98 (s, 3H), 1.89 (s, 3H), 1.88-1.77 (m, 5H), 1.22 (s, 3H), 1.13 (s, 3H), 1.06 (t, 3H).

Preparation of Comparative Compound C4

(2-methyl-4-propyl-1H-inden-1-yl)(2-propylcyclopenta-2,4-dien-1-yl)zirconium(IV) chloride Compound C4 (nPrCp)ZrCl$_3$(dme) (0.254 g) was added as a solid to a cold stirred mixture of lithium-2-Me-4-propyl indenyl (0.115 g) in diethyl ether. Almost instantly the reaction became yellow with thick precipitate. It was allowed to stir at room temperature for 5 hours. After 2 hours, solvent was removed in vacuo, and the residue was extracted with methylene chloride (20 mL) and filtered through celite. Solvent removal afforded yellow powder, which was suspended in hexane and stirred overnight. After 18 hours, the solid was collected via vacuum filtration, washed with minimal hexane and dried in vacuo to give a 0.160 g of final product in 57% yield. $^1$H NMR (Methylene Chloride-$d_2$) δ 7.52-7.46 (m, 1H), 7.19 (m, 1H), 7.06 (m, 1H), 6.48 (m, 1H), 6.27 (m, 1H), 5.99 (m, 1H), 5.87-5.83 (m, 1H), 5.78 (m, 1H), 5.74 (m, 1H), 3.00 (m, 1H), 2.85-2.74 (m, 1H), 2.49 (m, 2H), 2.38 (s, 3H), 1.91-1.66 (m, 2H), 1.58-1.45 (m, 2H), 1.05 (t, 3H), 0.91 (t, 3H).

Preparation of Compound E8 (Alkyl Bridged, Pseudo C2 Symmetric Ansa Metallocenes):

(7-(4-(tert-butyl)phenyl)-2-methyl-1H-inden-1-yl)chlorodimethylsilane A cold ether solution of lithium 2-Me-4-(4-tBu(phenyl))indenyl (3.15 g) was added slowly to a stirred ether solution of excess dichlorodimethylsilane (7.57 g). The reaction mixture was allowed to warm up to room temperature and was further stirred for 1 day. After 1 day, the reaction mixture is pale yellow with white precipitate. The solution was concentrated in vacuo to give a sticky yellow mixture. The mixture was then extracted with pentane (2×30 mL) and filtered over celite. Solvent removal in vacuo afforded the final product as a spectroscopically pure viscous yellow oil in essentially quantitative yield (100% yield). $^1$H NMR ($C_6D_6$): δ 7.61 (m, 2H) 7.47 (m, 4H) 7.23 (m, 1H) 6.93 (s, 1H) 3.42 (s, 1H) 2.13 (s, 3H) 1.37 (s, 9H) 0.29 (s, 3H) 0.04 (s, 3H).

(4-(4-(tert-butyl)phenyl)-2-methyl-1H-inden-1-yl)dimethylsilyl trifluoromethanesulfonate AgOTf (3.01 g) was added directly (as a solid) to an ether solution of indene (4.16 g). The flask was wrapped in aluminum foil, and the mixture was placed on a stir plate overnight. After 16 hours, the solution is cloudy pink with precipitate. Solvent was removed in vacuo, and the residue was extracted with pentane (2×30 mL) and filtered. Solvent removal afforded the product in good yield and purity as a very viscous brown oil in 94% yield. $^1$H NMR ($C_6D_6$): δ 7.47 (m, 2H) 7.40 (m, 2H) 7.15 (m, 3H) 6.77 (s, 1H) 3.20 (s, 1H) 1.92 (s, 3H) 1.29 (s, 9H) 0.19 (s, 3H) -0.19 (s, 3H).

1,5-bis(1-((4-(4-(tert-butyl)phenyl)-2-methyl-1H-inden-1-yl)dimethylsilyl)-2-methyl-1H-inden-4-yl)pentane To a pre-cooled diethylether solution of 1 equiv. of dilithium-(2-methyl-7-(5-(2-methyl-1H-inden-4-yl)pentyl)-indenyl) (adduct of 0.5Et$_2$O with 0.8C$_5$H$_{12}$) (0.68 g) was slowly added a pre-cooled ether solution of 2 equivalents of (4-(4-(tert-butyl)phenyl)-2-methyl-1H-inden-1-yl) dimethylsilyl trifluoromethane sulfonate (1.47 g). The reaction mixture was stirred for 2 hours at room temperature. After 2 hours the resulting pink suspension was concentrated in vacuo to give a pale pink solids. The solids were extracted with pentane (2×20 mL) filtered through celite and concentrated in vacuo to give a spectroscopically pure product as a mixture of rac/meso isomers. $^1$H NMR (Benzene-$d_6$) δ 7.63 (m, 4H), 7.50-7.42 (m, 8H), 7.16 (s, 8H), 6.93 (s, 2H), 6.75 (s, 2H), 3.70 (4s, 4H total), 2.81 (m, 4H), 2.11-1.83 (3s, 12H total), 1.76 (m, 4H), 1.48 (m, 2H), 1.31 (s, 18H), −0.27 (m, 12H).

1,5-bis(1-((4-(4-(tert-butyl)phenyl)-2-methyl-inden-1-yl)dimethylsilyl)-2-methyl-inden-4-yl)pentane tetralithiate nBuLi (2.6 mL of 2.5M) was slowly added to a stirred cooled solution of 1,5-bis(1-((4-(4-(tert-butyl)phenyl)-2-methyl-1H-inden-1-yl)dimethylsilyl)-2-methyl-1H-inden-4-yl)pentane (1.52 g) in diethylether. The mixture became dark orange upon addition of nBuLi. After ca 30 minutes solvent was removed in vacuo, and the resulting residue was washed with pentane (2×10 mL) and dried in vacuo. The obtained material was very pure and was used directly in the next step. The material (1.58 g, 97% yield) was isolated with ca 2 equiv. of diethylether. $^1$H NMR (400 MHz, THF-$d_8$) δ 7.72-7.63 (m, 6H), 7.59 (m, 2H), 7.39-7.33 (m, 4H), 6.55-6.47 (m, 4H), 6.41 (m, 2H), 6.31 (m, 2H), 6.18 (m, 2H), 5.97 (m, 2H), 2.79 (m, 4H), 2.56-2.43 (m, 12H), 1.83 (m, 4H), 1.61-1.48 (m, 2H), 1.38 (s, 18H), 0.75 (s, 12H).

1,5-bis(1-((4-(4-(tert-butyl)phenyl)-2-methyl-inden-1-yl)dimethylsilyl)-2-methyl-inden-4-yl)pentane(bis-dichlorozirconium). Compound E8. ZrCl$_4$ was slowly added to a stirred mixture of tetralithiated ligand in cold diethylether. The mixture changed color to very dark orange. It was allowed to warm up to room temperature and was stirred overnight. After 18 hours, the mixture is dark brown with some precipitate. The solution was concentrated in vacuo and the residue was extracted with methylene chloride (2×20 mL) and filtered over celite. Solvent was then removed again and pentane (30 mL) was added. The material appears to be completely insoluble in pentane, and is very dark in color (brown). Toluene (30 mL) was then added and the mixture was stirred at room temperature for 30 minutes. The resulting solids were then collected on a filter frit and washed with pentane to give 1.0 g (56% yield) of ochre colored material which was spectroscopically pure mixture of syn/anti isomers. $^1$H NMR (400 MHz, Methylene Chloride-$d_2$) δ 7.72-7.63 (m, 2H), 7.60-7.45 (m, 8H), 7.42-7.07 (m, 7H), 7.07-6.68 (m, 7H), 2.79-2.58 (m, 4H), 2.53-2.20 (multiple singlets, 12H), 1.77 (m, 4H), 1.64-0.90 (multiple singlets, 32H).

Preparation of Compound E9.

2-isopropyl-7-[5-(2-methyl-1H-inden-4-yl)pentyl]-1H-indene An ether slurry of 2-Me-4-Br-indene (0.983 g) and (dppp)NiCl$_2$ catalyst (0.127 g) was cooled to −35° C. in the glove box freezer. While stirring, a solution of bromo[5-(bromomagnesio)pentyl]magnesium (4.8 mL, 0.5M) was added. The reaction mixture became brown with precipitate as it warmed to room temperature. After ca 30 minutes, an ether solution of 2-iPr-4-Br-indene (1.150 g) was added directly and the overall mixture was heated at 42° C. overnight. After 18 hours, the reaction was quenched with water and diluted with 10% HCl solution. The organic layer was separated and the aqueous layer was extracted with ether (2×20 mL). The combined organic extracts were washed with saturated sodium bicarbonate (2×20 mL), water (2×20 mL) and brine (1×20 mL). The mixture was then dried over anhydrous MgSO4, filtered and concentrated in vacuo to give a red oil. The oil was chromatographed with EtOAc: hexane gradient (2% for 2 CV, followed by 5% for 5 CV). This allowed for isolation of reasonably pure pentyl bridged mixed bi-indene in 60% yield. $^1$H NMR (Methylene Chloride-$d_2$) δ 7.23-7.08 (m, 4H), 7.01-6.91 (m, 2H), 6.52 (m, 2H), 3.32 (s, 2H), 3.27 (s, 2H), 2.87-2.76 (m, 1H), 2.74-2.65 (m, 4H), 2.19 (s, 3H), 1.82-1.66 (m, 4H), 1.55-1.46 (m, 2H), 1.26 (d, 6H).

dilithium-2-isopropyl-7-[5-(2-methyl-inden-4-yl)pentyl]-indenyl nBuLi (2.46 mL of 2.5M) was slowly added to a stirred ether solution of previously prepared mixed-indene (1.0 g) at room temperature. Upon completion of addition, white chunky precipitate formed. The reaction was stirred for 1 hour and solvent was then removed in vacuo, the residue was slurried in pentane and filtered. The solid was washed with additional pentane and dried in vacuo to give a spectroscopically pure compound in quantitative yield. $^1$H NMR (400 MHz, Benzene-$d_6$/THF-$d_8$) δ 7.46-7.34 (m, 2H), 6.76 (m, 2H), 6.70-6.58 (m, 2H), 6.04 (m, 4H), 3.21-3.07 (m, 1H), 3.00 (m, 4H), 2.53-2.45 (s, 3H), 2.09-1.94 (m, 4H), 1.79-1.66 (m, 4H), 1.43 (d, 6H).

(4-(4-(tert-butyl)phenyl)-2-methyl-1H-inden-1-yl)(4-(5-(1-((4-(4-(tert-butyl)phenyl)-2-methyl-1H-inden-1-yl)dimethylsilyl)-2-isopropyl-1H-inden-4-yl)pentyl)-2-methyl- 1H-inden-1-yl)dimethylsilane To a pre-cooled diethylether solution of dilithium-2-isopropyl-7-[5-(2-methyl-inden-4-yl)pentyl]-indenyl prepared in the previous step (0.99 g) was slowly added a pre-cooled diethylether solution of (4-(4-(tert-butyl)phenyl)-2-methyl-1H-inden-1-yl)dimethylsilyl trifluoromethanesulfonate (2.59 g). The reaction mixture was stirred for 2 hours at room temperature. After 2 hours, the mixture was concentrated in vacuo to give a pale brown solids. The solids were extracted with pentane (2×20 mL), filtered over celite and dried in vacuo to give a spectroscopically pure white solid as a mixture of isomers in 97% yield. $^1$H NMR (400 MHz, Benzene-d$_6$) δ 7.67-7.39 (m, 10H), 7.38-7.08 (m, 10H), 6.99-6.70 (m, 4H), 4.05-3.57 (multiple s, 4H), 2.83 (m, 4H), 2.70-2.53 (m, 1H), 2.11-1.85 (multiple s, 9H), 1.84-1.66 (m, 4H), 1.47 (m, 2H), 1.34-1.17 (overlapping m, 21H), 1.08-1.00 (m, 3H), −0.05--0.42 (m, 12H).

(4-(4-(tert-butyl)phenyl)-2-methyl-inden-1-yl)(4-(5-(1-((4-(4-(tert-butyl)phenyl)-2-methyl-inden-1-yl)dimethylsilyl)-2-isopropyl-inden-4-yl)pentyl)-2-methyl-inden-1-yl)dimethylsilane tetralithiate nBuLi (4.4 mL of 2.5M) was slowly added to a stirred ether solution of ligand (2.67 g) in diethylether. Almost instantly, the reaction mixture became deep red. It was allowed to stir overnight at room temperature. After 18 hours, solvent was removed in vacuo to give red solids. The solids were suspended in pentane and filtered. The resulting red material was washed with excess pentane and dried in vacuo to give a spectroscopically pure product in 97% yield. Approximately 1.75 equivalents of diethylether has been carried through. $^1$H NMR (Benzene-d$_6$/THF-d8) δ 7.99-7.75 (m, 8H), 7.44-7.34 (m, 4H), 6.89-6.52 (m, 8H), 6.50-6.41 (m, 2H), 6.39-6.32 (m, 1H), 6.16 (s, 1H), 3.68 (m, 1H), 2.96 (bs, 4H), 2.57 (s, 9H), 1.94 (bs, 4H), 1.67 (bs, 2H), 1.45 (m, 6H), 1.35-1.12 (m, 18H), 1.01-0.91 (m, 12H).

(4-(4-(tert-butyl)phenyl)-2-methyl-inden-1-yl)(4-(5-(1-((4-(4-(tert-butyl)phenyl)-2-methyl-inden-1-yl)dimethylsilyl)-2-isopropyl-inden-4-yl)pentyl)-2-methyl-inden-1-yl)dimethylsilane-bis(dichlorozirconium). Compound E9. ZrCl4 (OEt2)2 (2.24 g) was added as a solid to a stirred diethylether solution of tetralithiated (2.80 g) ligand at −35° C. The mixture was allowed to warm up to room temperature. After 20 minutes, the mixture is bright orange with copious amount of precipitate. The mixture was stirred overnight. After 18 hours, solvent was removed in vacuo and the residue was extracted with methylene chloride (2×20 mL) and filtered over celite. Solvent was removed again, and the resulting residue was suspended in pentane and filtered. The resulting orange solid was washed with additional pentane (20 mL) and dried in vacuo. $^1$H NMR (Methylene Chloride-d2) δ 7.74-7.45 (m, 12H), 7.40-7.31 (m, 1H), 7.23-7.07 (m, 3H), 7.05-6.70 (m, 8H), 3.64-3.10 (m, 1H), 2.69 (m, 4H), 2.53-2.20 (multiple s, 9H), 1.54-1.26 (overlapping m, 38H).

Propylene Polymerization with Binuclear Catalysts.

Propylene polymerizations with metallocene was prepared by high-throughput conditions according to the following general procedure. A pre-weighed glass vial insert and disposable stirring paddle were fitted to each reaction vessel of the reactor, which contains 48 individual reaction vessels. The reactor was then closed and propylene (typically 1 mL) was introduced to each vessel as a condensed gas liquid (typically 1 mL) or gas. Then solvent (typically the isohexane) was added to bring the total reaction volume, including the subsequent additions, to 5 mL and the reactor vessels were heated to their set temperature (usually from about 50° C. to about 110° C.). The contents of the vessel were stirred at 800 rpm. An activator solution (typically 100-1,000 molar equivalents of methyl alumoxane (MAO) in toluene) was then injected into the reaction vessel along with 500 microliters of toluene or isohexane. Catalyst (typically 0.50 mM in toluene, such as 20-40 nmol of catalyst) and another aliquot of toluene or isohexane (500 microliters) were then added to initiate the reaction. Equivalence is determined based on the mol equivalents relative to the moles of the transition metal in the catalyst complex. The reaction was then allowed to proceed until a pre-determined amount of pressure had been taken up by the reaction. Alternatively, the reaction may be allowed to proceed for a set amount of time. At this point, the reaction was quenched by pressurizing the vessel with compressed air. After the polymerization reaction, the glass vial insert containing the polymer product and solvent was removed from the pressure cell and the inert atmosphere glove box, and the volatile components were removed using a Genevac HT-12 centrifuge and Genevac VC3000D vacuum evaporator operating at elevated temperature and reduced pressure. The vial was then weighed to determine the yield of the polymer product. The resultant polymer was analyzed by Rapid GPC (see below) to determine the molecular weight and by DSC (see below) to determine melting point.

To account for an extra metallocene center in the binuclear complexes, MAO loading used during the activation step was doubled. Therefore, for mononuclear metallocenes (C$_1$ and C$_2$) 500 equiv. of MAO was used, while for the inventive examples (E1, E2 and E3) 1,000 equiv. of MAO was used. The data for homopolymers is described in Table 1 below.

TABLE 1

Homopolypropylenes prepared with binuclear catalysts

| Catalyst | Activity (kg/mmol · h) | Mw (kDa) | PDI | Tm (oC) |
|---|---|---|---|---|
| C$_1$ (comp.) | 44.9 ± 2.5 | 141.3 ± 11.9 | 1.6 ± 0.1 | 149.6 ± 0.4 |
| C$_2$ (comp.) | 22.4 ± 0.4 | 41.0 ± 2.6 | 1.9 ± 0.1 | 125.3 ± 4.5 |
| E1 | 16.6 ± 0.5 | 171.3 ± 13.6 | 2.1 ± 0.3 | 148.9 ± 0.3 |
| E2 | 18.1 ± 0.7 | 89.0 ± 3.0 | 2.6 ± 0.4 | 147.6 ± 0.2 |
| E4 | 134.3 ± 3.5 | 84.3 ± 5.7 | 2.0 ± 0.2 | 147.6 ± 0.8 |
| E5 | 25.9 ± 4.8 | 93.3 ± 1.5 | 1.9 ± 0.1 | 150.3 ± 0.7 |

Experimental conditions: 1 mL of liquid propylene, 70° C. in isohexane. [Zr]=30 nmol, MAO/Zr=500:1.

All catalysts showed good activities in propylene polymerization under industrially relevant conditions. The 4,4'-biindene catalysts E1 and E2 were generally less active compared to their mononuclear analogs C$_1$ and C$_2$, however, E1 and E2 produced polymers of slightly higher molecular weights and broader polydispersity (Mw between 20 and 200 with polydiseprity of about 2.2 to 5). An interesting feature of these catalysts was that the mixed analog E2 (2-Me, 2-iPr) did not exhibit any significant decrease in polymer crystallinity relative to E1 (2-Me, 2-Me). For example, a severe drop in polymer crystallinity was observed when going from 2-Me to 2-iPr substitution of the indene ring (149° C. vs 125° C.) in the mononuclear analogs (C$_1$ and C$_2$). Consistent with mononuclear analogs, polymer molecular weights decreased with the broadening of polydisperisties with catalysts bearing 2-iPr substituent of the indene ring. When two indene rings were linked by a phenyl group (E3), a significant increase in activity with the drop of M$_w$ capability was observed relative to the control catalyst C$_1$.

In terms of polymer microstructure, the trends observed with binuclear catalysts were similar relative to the mononuclear analogs, with one major difference—installment of the 2-iPr group did not seem to significantly affect the overall meso pentad in complexes E1 and E2 (0.895 vs 0.857). This effect is much more prominent in catalysts C1 and C2 (0.917 vs 0.736). Consistent with mononuclear analogs, regioselectivity was significantly improved with 2-iPr substitution, at the much lesser extent of decreased catalyst stereoselectivity. The phenyl linker in binuclear catalyst E4 had a significant effect on decreasing stereoselectivity relative to mononuclear analog C1 with slight improvements to overall regioselectivity.

TABLE 2

Microstructure analysis ($^{13}$C NMR) of homopolypropylenes

| Catalyst | mmmm | Total stereo errors | Total 2,1 regioerrors | Total 1,3 regioerrors |
|---|---|---|---|---|
| C1 | 0.917 | 155 | 5 | 3 |
| C2 | 0.736 | 550 | 0 | 10 |
| E1 | 0.895 | 228 | 28 | 7 |
| E2 | 0.857 | 320 | 6 | 7 |
| E4 | 0.861 | 319 | 3 | 0 |

In terms of polymer microstructure, the trends observed with binuclear catalysts were similar relative to the mononuclear analogs, with one major difference—installment of the 2-iPr group did not seem to significantly affect the overall meso pentad in complexes E1 and E2 (0.895 vs 0.857). This effect is much more prominent in catalysts C1 and C2 (0.917 vs 0.736). Consistent with mononuclear analogs, regioselectivity was significantly improved with 2-iPr substitution, at the much lesser extent of decreased catalyst stereoselectivity. The phenyl linker in binuclear catalyst E3 had a significant effect on decreasing stereoselectivity relative to mononuclear analog C1 with slight improvements to overall regioselectivity.

Ethylene-Propylene (EP) Copolymers.

Ethylene-propylene (EP) co-polymerizations was carried out by high-throughput conditions according to the following general procedure. A pre-weighed glass vial insert and disposable stirring paddle were fitted to each reaction vessels of the reactor, which contains 48 individual reaction vessels. The reactor was then closed and propylene (typically 1 mL) was introduced to each vessel as a condensed gas liquid (typically 1 mL) or gas. Then solvent (typically the isohexane) was added to bring the total reaction volume, including the subsequent additions, to 5 mL and the reactor vessels were heated to their set temperature (usually from about 50° C. to about 110° C.). The contents of the vessel were stirred at 800 rpm. An activator solution (typically 100-1,000 molar equivalents of methyl alumoxane (MAO) in toluene) was to then injected into the reaction vessel along with 500 microliters of toluene or isohexane. The reactors were then pressurized by adding the desired ethylene pressure on top of the background pressure of propylene (typically 20-120 psi). Catalyst (typically 0.50 mM in toluene, such as 20-40 nmol of catalyst) and another aliquot of toluene or isohexane (500 microliters) were then added to initiate the reaction. Equivalence is determined based on the mol equivalents relative to the moles of the transition metal in the catalyst complex. The reaction was then allowed to proceed until a pre-determined amount of pressure had been taken up by the reaction. Alternatively, the reaction may be allowed to proceed for a set amount of time. At this point, the reaction was quenched by pressurizing the vessel with compressed air. After the polymerization reaction, the glass vial insert containing the polymer product and solvent was removed from the pressure cell and the inert atmosphere glove box, and the volatile components were removed using a Genevac HT-12 centrifuge and Genevac VC3000D vacuum evaporator operating at elevated temperature and reduced pressure. The vial was then weighed to determine the yield of the polymer product. The resultant polymer was analyzed by Rapid GPC (see below) to determine the molecular weight and by DSC (see below) to determine melting point.

In order to probe the capability of binuclear systems to produce EP copolymers, a high-throughput screen was conducted under standard conditions (70° C., isohexane) with a gradient of ethylene pressures.

TABLE 3

EP copolymer data at different ethylene pressures.

| | PC2 (psi) | | | | | | | | | |
|---|---|---|---|---|---|---|---|---|---|---|
| | 20 psi | | 40 psi | | 60 psi | | 80 psi | | 120 psi | |
| Catalyst | A (kg/ mmol · h) | Mw (kDa) | A (kg/ mmol · h) | Mw (kDa) | A (kg/ mmol · h) | Mw (kDa) | A (kg/ mmol · h) | Mw (kDa) | A (kg/ mmol · h) | Mw (kDa) |
| C1 | 292 | 116 | 478 | 116 | 610 | 132 | 685 | 128 | 968 | 134 |
| C2 | 218 | 45 | 300 | 52 | 432 | 71 | — | — | — | — |
| E1 | 123 | 106 | 196 | 115 | 278 | 120 | 304 | 138 | 526 | 124 |
| E2 | 103 | 62 | 140 | 73 | 173 | 91 | — | — | — | — |
| E4 | — | — | 505 | 69 | — | — | 932 | 79 | 1451 | 85 |

All catalysts were highly active in EP copolymerization. The 4,4'-biindene catalysts were 2-3 times lower in activity compared to C1 and C2 but they produced polymers of comparable molecular weight (e.g. 20 to 200 kg/mol) with polydispersities of between 2.2 to 5. And although the binuclear 4,4'-biindene catalysts showed lower activity relative to C1 and C2, they were much better at incorporating ethylene in the EP copolymers. A significant activity boost was achieved with phenyl linked catalyst E3, however, with a marked decrease in polymer molecular weights. The ethylene incorporation in the copolymer is summarized in Table 4 below.

TABLE 4

Ethylene content (wt %) in EP

| Catalyst | 20 psi | 40 psi | 60 psi | 80 psi | 120 psi |
|---|---|---|---|---|---|
| C1 | 9.9 | 20.2 | 34.5 | 41.8 | 45.7 |
| C2 | 8.2 | 21.1 | 29.2 | — | — |

TABLE 4-continued

| Catalyst | Ethylene content (wt %) in EP | | | | |
|---|---|---|---|---|---|
| | 20 psi | 40 psi | 60 psi | 80 psi | 120 psi |
| E1 | 15.8 | 33.5 | 49.7 | 52.3 | 43.1 |
| E2 | 12.8 | 25.8 | 36.6 | 34.9 | 50.7 |
| E4 | — | 17.6 | — | 34.9 | 50.7 |

As reported above, with as little as 60 psi of partial ethylene pressure, complex E1 achieved about 50 wt % ethylene incorporation in EP copolymer. On the other hand, catalyst C1 only incorporated 34.5 wt % of ethylene under identical conditions.

Supported E1 Catalyst and Slurry Polymerization of Propylene.

Preparation of Silica Supported MAO (sMAO)

In a celstir bottle, 20.0 g of silica (DM Series, AGC Chemicals) and 91.2 g of toluene were mixed. The silica slurry was then allowed to cool in the freezer for 30 minutes. In a square bottle, 31.8 g MAO (30% toluene solution), was charged in and also cooled down in the freezer for 30 minutes. After 30 minutes, the cold MAO solution was added slowly into the silica slurry bottle by pipette. The solution was allowed to stir at room temperature for 1 hour. After 1 hour, the oil bath was heated up to 100° C. and the solution stirred at 100° C. for 3 hours. After 2.5 hours of stirring, the celstir bottle was taken off the heat and continued to stir for another 30 minutes. The mixture was then filtered, washed 2×30 mL toluene and 2×30 mL isohexane. The product was dried under vacuum overnight to afford a silica supported SMAO as a free flowing white powder.

Preparation of Supported Catalyst E1.

In a 20 mL scintitillation vial, 1.1 g of SMAO was slurried in 10 mL of toluene. The slurry was placed on a mechanical shaker. Triisobutylaluminum (0.39 mL of 1M solution in hexane) was then added and the slurry was allowed to shake for 15 minutes. After 15 minutes, 17.0 mg of metallocene E1 was then added and the mixture was allowed to react for 4 hours. After 4 hours, the slurry was filtered, the solid was washed with toluene (2×5 mL) and pentane (2×5 mL) and dried in vacuo to afford the supported catalyst E1 as an orange solid.

The activity and polymer properties of E1 for making homopolypropylene in slurry polymerization was examined. Supported E1 catalyst (ca. 0.5-0.6 g) was slurried into dry and degassed mineral oil to yield a slurry that contains 5% by weight of supported catalyst. The supported catalyst was added to the reactor as a slurry in oil. The catalyst slurry containing the catalyst was injected using 250 mL propylene into a 2 L autoclave reactor containing propylene (1000 mL) (total propylene 1250 mL), $H_2$ (provided from a 183 mL container under the pressure indicated in the table) and triisobutylaluminum (TIBAL, 2.0 ml of a 5% toluene solution), at ambient temperature for 5 minutes. Subsequently, the reactor temperature was raised to about 70° C. and the polymerization was run for about 50 minutes. The reactor was then cooled to room temperature and vented.

The polymerization was done in a staged manner (30 minutes without hydrogen, followed by 20 minutes with hydrogen). The data is summarized in a Table 5 below.

TABLE 5

Propylene slurry polymerization with E1 metallocene

| $H_2$ (psi) | Yield (g) | A (g/g · h) | Mw (kDa) | PDI | mmmm | $T_m$ (° C.) |
|---|---|---|---|---|---|---|
| 44 | 65.0 | 1495 | 140 | 2.2 | 0.894 | 153.1 |

Despite its large size, the metallocene E1 displayed moderate activity in slurry propylene polymerization in bulk propylene. No reactor fouling was observed.

Ethylene polymerizations and ethylene-octene copolymerizations with catalysts E6-E7 were carried out under high-throughput conditions according to the following general procedure. A pre-weighed glass vial insert and disposable stirring paddle were fitted to each reaction vessel of the reactor, which contains 48 individual reaction vessels. The reactor was then closed and ethylene gas was introduced at a desired pressure. Then isohexane was added to bring the total reaction volume, including the subsequent additions, to 5 mL and the reactor vessels were heated to their set temperature (70° C.). The contents of the vessel were stirred at 800 rpm. An activator solution (typically 100-1000 molar equivalents of methyl alumoxane (MAO) in toluene) was then injected into the reaction vessel along with 500 microliters of isohexane, followed by addition of 1-octene (typically 50-150 μL). The catalyst and another aliquot of isohexane (500 microliters) were then added to initiate the reaction. Equivalence was determined based on the mol equivalents relative to the moles of the transition metal in the catalyst complex. The reaction was then allowed to proceed until a pre-determined amount of pressure had been taken up by the reaction. The reaction was quenched by pressurizing the vessel with compressed air. After the polymerization reaction, the glass vial insert containing the polymer product and solvent was removed from the pressure cell and the inert atmosphere glove box, and the volatile components were removed using a Genevac HT-12 centrifuge and Genevac VC3000D vacuum evaporator operating at elevated temperature and reduced pressure. The vial was then weighed to determine the yield of the polymer product. The resultant polymer was analyzed by Rapid GPC (see below) to determine the molecular weight and by DSC (see below) to determine melting point.

TABLE 6

Ethylene-Octene copolymers prepared with catalysts E6 and E7

| Catalyst | Ethylene (psi) | Octene (uL) | Activity (kg/mmol · h) | $M_w$ (kg/mol) | PDI | $T_m$ (° C.) | Octene in polymer (wt %) |
|---|---|---|---|---|---|---|---|
| C3 | 115 | 0 | 145 ± 53 | 556 ± 20 | 2.40 | 136.4 ± 0.1 | — |
| C3 | 115 | 50 | 267 ± 25 | 456 ± 54 | 2.30 | 129.1 ± 0.2 | 4.0 ± 0.6 |
| C3 | 115 | 100 | 234 ± 48 | 410 ± 45 | 2.55 | 126.1 ± 0.5 | 2.8 ± 0.6 |

TABLE 6-continued

Ethylene-Octene copolymers prepared with catalysts E6 and E7

| Catalyst | Ethylene (psi) | Octene (uL) | Activity (kg/mmol · h) | $M_w$ (kg/mol) | PDI | $T_m$ (° C.) | Octene in polymer (wt %) |
|---|---|---|---|---|---|---|---|
| C3 | 115 | 150 | 222 ± 15 | 345 ± 8 | 2.50 | 124.2 ± 0.1 | 4.6 ± 0.2 |
| C4 | 115 | 0 | 559 ± 1 | 277 ± 11 | 1.55 | 136.1 ± 0.1 | — |
| C4 | 115 | 50 | 629 ± 10 | 247 ± 13 | 1.70 | 122.2 ± 0.2 | 4.6 ± 0.7 |
| C4 | 115 | 100 | 606 ± 34 | 226 ± 5 | 1.80 | 117.0 ± 0.5 | 8.5 ± 0.3 |
| C4 | 115 | 150 | 589 ± 7 | 223 ± 5 | 1.70 | 112.4 ± 0.3 | 11.0 ± 0.1 |
| E6 | 115 | 0 | 146 ± 8 | 620 ± 10 | 1.85 | 136.5 ± 0.1 | — |
| E6 | 115 | 50 | 135 ± 13 | 499 ± 13 | 2.05 | 128.9 ± 0.0 | 2.3 ± 0.2 |
| E6 | 115 | 100 | 154 ± 12 | 444 ± 11 | 2.15 | 125.5 ± 0.1 | 3.1 ± 0.6 |
| E6 | 115 | 150 | 148 ± 2 | 382 ± 28 | 2.05 | 123.3 ± 0.2 | 4.1 ± 0.5 |
| E7 | 115 | 0 | 251 ± 14 | 259 ± 25 | 1.80 | 136.2 ± 0.4 | — |
| E7 | 115 | 50 | 273 ± 11 | 224 ± 3 | 1.70 | 125.0 ± 0.6 | 3.3 ± 0.0 |
| E7 | 115 | 100 | 260 ± 15 | 219 ± 2 | 1.70 | 119.5 ± 0.5 | 5.0 ± 0.3 |
| E7 | 115 | 150 | 248 ± 9 | 214 ± 6 | 1.65 | 115.9 ± 0.3 | 6.8 ± 0.4 |

Conditions: 85° C., 115 psi ethylene with a gradient of 1-octene (50-150 μL).

The data in Table 6 indicates that binuclear catalysts (E6 and E7) demonstrate comparable activities, molecular weight capability and incorporation ability in EO copolymers as comparative examples. In the case of unbridged system E6, slight improvement in molecular weight capability was observed compared to C3 comparative example. At the same time, binuclear analog E6 demonstrated overall narrower PDI compared to control catalyst C3.

The following test procedures and methods were used.

Rapid GPC Procedure

To determine molecular weight related values by GPC, high temperature size 5 exclusion chromatography was performed using an automated "Rapid GPC" system as generally described in U.S. Pat. Nos. 6,491,816; 6,491,823; 6,475,391; 6,461,515; 6,436,292; 6,406,632; 6,175,409; 6,454,947; 6,260,407; and 6,294,388, each of which is fully incorporated herein by reference for US purposes. This apparatus has a series of three 30 cm×7.5 mm linear columns, each containing PLgel 10 μm, Mix B. The GPC system was calibrated using polystyrene standards ranging from 580-3,390,000 g/mol. The system was operated at an eluent flow rate of 2.0 mL/minutes and an oven temperature of 165° C. 1,2,4-trichlorobenzene was used as the eluent. The polymer samples were dissolved in 1,2,4-trichlorobenzene at a concentration of 0.1-0.9 mg/mL. 250 uL of a polymer solution was injected into the system. The concentration of the polymer in the eluent was monitored using an evaporative light scattering detector (as shown by the examples in Table 3) or Polymer Char IR4 detector. The molecular weights presented are relative to linear polystyrene standards and are uncorrected.

DSC Procedure

For the high throughput samples, the melting temperature (Tm) was measured using Differential Scanning Calorimetry (DSC) using commercially available equipment such as a TA Instruments TA-Q200 DSC. Typically, 5 to 10 mg of molded polymer or plasticized polymer is sealed in an aluminum pan and loaded into the instrument at about room temperature. Samples were pre-annealed at about 220° C. for about 15 minutes and then allowed to cool to about room temperature overnight. The samples were then heated to about 220° C. at a heating rate of about 100° C./min, held at this temperature for at least about 5 minutes, and then cooled at a rate of about 50° C./min to a temperature typically at least about 50° C. below the crystallization temperature. Melting points were collected during the heating period.

$^1$H NMR Procedure $^1$H NMR data of catalysts and ligands were collected at 23° C. using a 5 mm tube on a 400 MHz Bruker spectrometer with deuterated methylene chloride (CD2Cl2), benzene (C6D6) or THF (thf-d8). Data was recorder with a 30° pulse with either 8 or 16 transients.

$^1$H NMR data of the polymer was collected at 120° C. using a 10 mm cryoprobe on a 600 MHz Bruker spectrometer with deuterated tetrachloroethane (tce-d2). Samples were prepped with a concentration of 30 mg/mL at 140° C. Data was recorded with a 30° pulse, 5 second delay, 512 transients. Signals were integrated and the numbers of unsaturation types per 1000 carbons were reported. The shift regions for unsaturations were in the following table.

| Unsaturation Type | Region (ppm) | Number of hydrogens per structure |
|---|---|---|
| Vinyl | 4.95-5.10 | 2 |
| Vinylidene | 4.70-4.84 | 2 |
| Vinylene | 5.31-5.55 | 2 |
| Trisubstituted | 5.11-5.30 | 1 |

Peak melting point, $T_m$, described for reactor batches (also referred to as melting point) and peak crystallization temperature, $T_c$, (also referred to as crystallization temperature) were determined using the following DSC procedure according to ASTM D3418-03. Differential scanning calorimetric (DSC-2) data were obtained using a TA Instruments model DSC2500 machine. Samples weighing approximately 5 to 10 mg were sealed in an aluminum hermetic sample pan and loaded into the instrument at about room temperature. The DSC data was recorded by first gradually heating the sample to about 200° C. at a rate of about 10° C./minute. The sample was kept at about 200° C. for 5 minutes, then cooled to about −50° C. at a rate of about 10° C./minute, followed by an isothermal for about 5 minutes and heating to about 200° C. at about 10° C./minute, holding at about 200° C. for about 5 minutes and then cooled to about 25° C. at a rate of about 10° C./minute. Both the first and second cycle thermal events were recorded. The melting and crystallization temperatures reported here were obtained during the second heating/cooling cycle unless otherwise noted. In the event of conflict between the DSC Procedure-1 and DSC procedure-2, DSC procedure-2 was used.

Unless otherwise indicated, the distribution and the moments of molecular weight (Mw, Mn, Mz, Mw/Mn, etc.), the comonomer content, and the branching index (g') were determined by using a high temperature Gel Permeation Chromatography (Polymer Char GPC-IR) equipped with a multiple-channel band-filter based Infrared detector IR5 with a multiple-channel band filter based infrared detector ensemble IR5 with band region covering from about 2700 cm$^{-1}$ to about 3000 cm$^{-1}$ (representing saturated C—H stretching vibration), an 18-angle light scattering detector and a viscometer. Three Agilent PLgel 10-μm Mixed-B LS columns were used to provide polymer separation. Reagent grade 1,2,4-trichlorobenzene (TCB) (from Sigma-Aldrich) comprising ~300 ppm antioxidant BHT were used as the mobile phase at a nominal flow rate of ~1.0 mL/min and a nominal injection volume of ~200 μL. The whole system including transfer lines, columns, and detectors were contained in an oven maintained at ~145° C. A given amount of sample was weighed and sealed in a standard vial with ~10 μL flow marker (heptane) added thereto. After loading the vial in the auto-sampler, the oligomer or polymer was automatically dissolved in the instrument with ~8 mL added TCB solvent at ~160° C. with continuous shaking. The sample solution concentration was from ~0.2 to ~2.0 mg/ml, with lower concentrations used for higher molecular weight samples. The concentration, c, at each point in the chromatogram was calculated from the baseline-subtracted IR5 broadband signal, I, using the equation: c=αI, where α is the mass constant determined with polyethylene or polypropylene standards. The mass recovery was calculated from the ratio of the integrated area of the concentration chromatography over elution volume and the injection mass which was equal to the pre-determined concentration multiplied by injection loop volume. The conventional molecular weight (IR MW) was determined by combining universal calibration relationship with the column calibration which was performed with a series of monodispersed polystyrene (PS) standards ranging from 700 to 10M gm/mole. The MW at each elution volume was calculated with following equation:

$$\log M = \frac{\log(K_{PS}/K)}{\alpha + 1} + \frac{\alpha_{PS} + 1}{\alpha + 1} \log M_{PS}$$

where the variables with subscript "PS" stand for polystyrene while those without a subscript were for the test samples. In this method, $\alpha_{PS}=0.67$ and $K_{PS}=0.000175$, α and K for other materials were as calculated and published in literature (Sun, T. et al. *Macromolecules* 2001, 34, 6812), except that for purposes of this present disclosure and claims thereto, α=0.705 and K=0.0000229 for ethylene-propylene copolymers and ethylene-propylene-diene terpolymers, α=0.695 and K=0.000579 for linear ethylene polymers, α=0.705 and K=0.0002288 for linear propylene polymers, and α=0.695 and K=0.000181 for linear butene polymers. Concentrations are expressed in g/cm$^3$, molecular weight is expressed in g/mole, and intrinsic viscosity (hence K in the Mark-Houwink equation) is expressed in dL/g unless otherwise noted.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A catalyst compound represented by Formula (I)

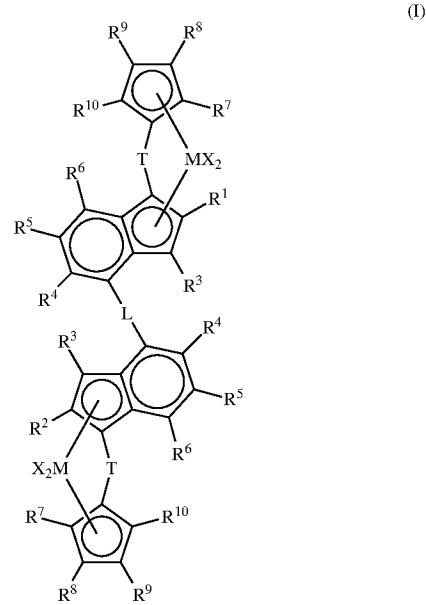

wherein:
M is a transition metal selected from group 3, 4; or 5 of the Periodic Table of Elements;
L is a linking group selected from a single covalent bond, divalent C$_1$-C$_{20}$ hydrocarbyl, aryl or substituted aryl groups;
T is an optional bridging group;
each X is a univalent anionic ligand, or two Xs are joined and bound to the metal atom to form a metallocycle ring, or two Xs are joined to form a chelating ligand, a diene ligand, or an alkylidene ligand;
R$^1$ and R$^2$ are each independently a hydrogen atom or substituted or unsubstituted C$_1$ to C$_{20}$ hydrocarbyl group;
R$^3$, R$^5$, R$^6$ and R$^7$ are each independently a hydrogen atom or a substituted or unsubstituted C$_1$ to C$_{20}$ hydrocarbyl group, and, optionally; R$^5$ and R$^6$ are joined to form a cyclic structure;

R⁴ is hydrogen; and

R⁸, R⁹, and R¹⁰ are each independently a substituted or unsubstituted $C_1$ to $C_6$ hydrocarbyl group and, optionally, R⁹ and R¹⁰ are joined to form a cyclic structure.

2. The catalyst compound of claim 1, wherein M is zirconium.

3. The catalyst compound of claim 1, wherein each X is a chloride.

4. The catalyst compound of claim 1, wherein L is a linear divalent $C_2$-$C_{10}$ hydrocarbyl or di-functional phenyl group.

5. The catalyst compound of claim 1, wherein L is a linear divalent $C_5$ hydrocarbyl or divalent phenyl group.

6. The catalyst compound of claim 1, wherein L is a divalent phenyl group.

7. The catalyst compound of claim 1, wherein the catalyst compound is represented by any of the structures E1 to E9:

Compound E1

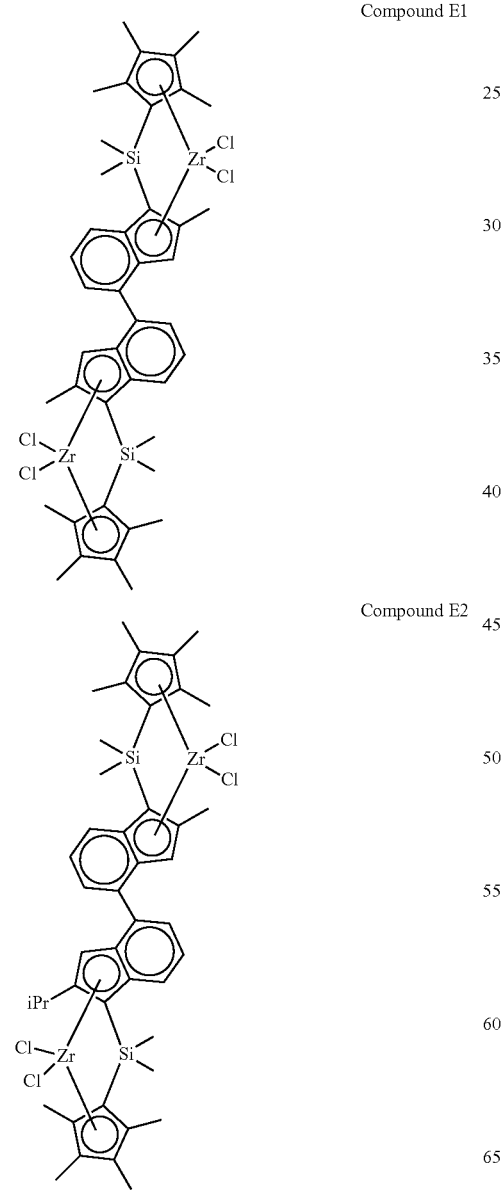

Compound E2

-continued

Compound E3

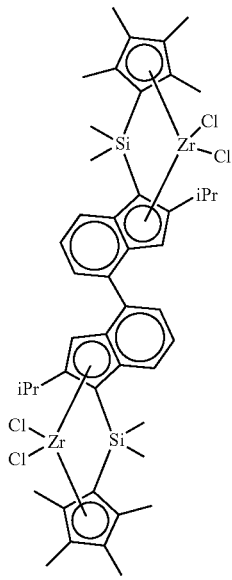

Compound E4

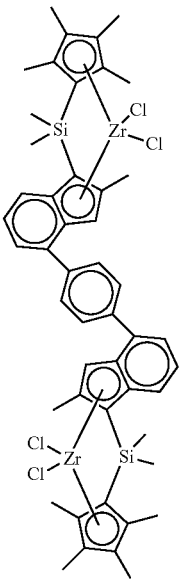

Compound E5

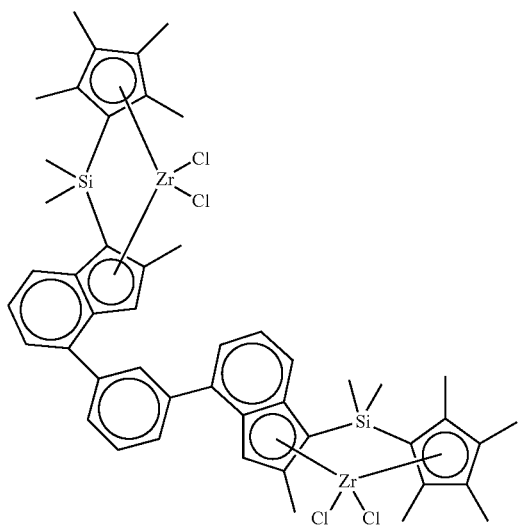

Compound E6

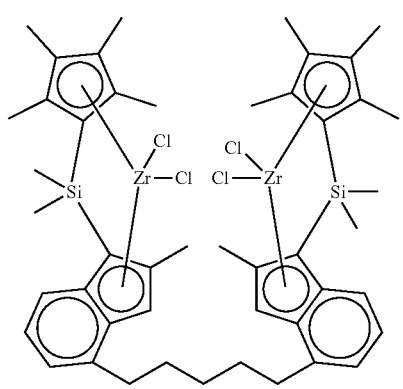

Compound E7

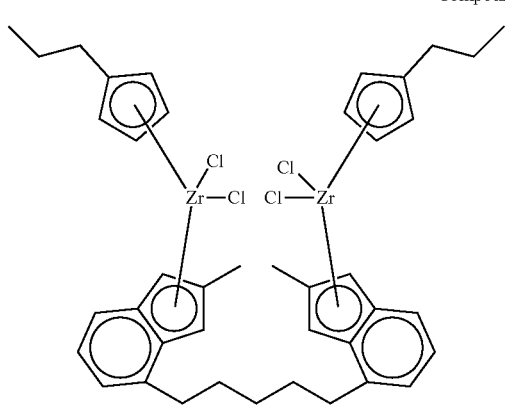

Compound E8

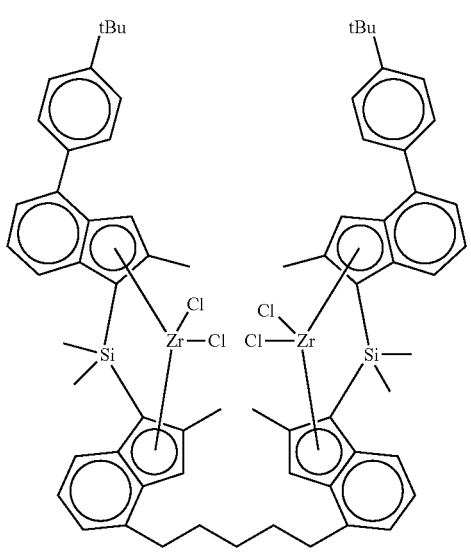

Compound E9

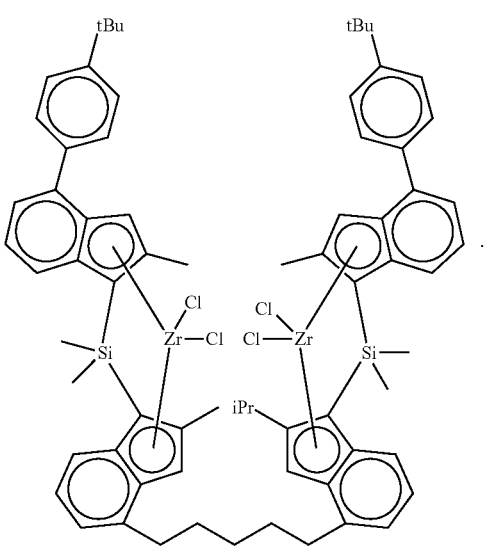

8. The catalyst compound of claim 1, wherein the catalyst is unbridged and the optional T is not present.

9. The catalyst compound of claim 1, wherein the catalyst is bridged and T is represented by the formula: (R*2G)g, where each G is C, Si, or Ge, g is 1 or 2, and each R* is, independently, hydrogen, halogen, $C_1$ to $C_{20}$ hydrocarbyl or a $C_1$ to $C_{20}$ substituted hydrocarbyl.

10. The catalyst compound of claim 9, wherein two or more R* form an aromatic or a partially saturated or saturated cyclic or fused ring system.

11. A process for polymerizing one or more olefins, comprising:
  reacting a first olefin and optionally a second olefin in the presence of a bimetallocene catalyst compound, in a reactor to form a polymer, wherein the bimetallocene catalyst compound is represented by Formula (I):

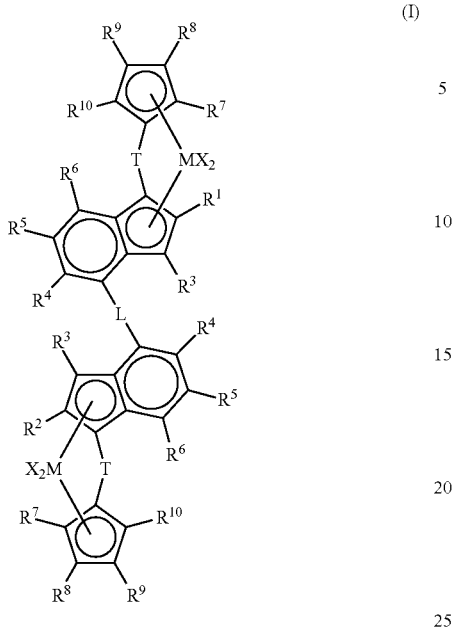

(I)

wherein:

M is a transition metal selected from group 3, 4, or 5 of the Periodic Table of Elements;

L is a linking group selected from a single covalent bond, divalent $C_1$-$C_{20}$ hydrocarbyl, aryl or substituted aryl groups;

T is an optional bridging group;

each X is a univalent anionic ligand, or two Xs are joined and bound to the metal atom to form a metallocycle ring, or two Xs are joined to form a chelating ligand, a diene ligand, or an alkylidene ligand;

$R^1$ and $R^2$ are each independently a hydrogen atom or substituted or unsubstituted $C_1$ to $C_{20}$ hydrocarbyl group;

$R^3$, $R^5$, $R^6$ and $R^7$ are each independently a hydrogen atom or a substituted or unsubstituted $C_1$ to $C_{20}$ hydrocarbyl group, and, optionally, $R^5$ and $R^6$ are joined to form a cyclic structure;

$R^4$ is hydrogen; and $R^8$, $R^9$ and $R^{10}$ are each independently a substituted or unsubstituted $C_1$ to $C_6$ hydrocarbyl group and, optionally, $R^9$ and $R^{10}$ are joined to form a cyclic structure.

12. The process of claim 11, wherein M is zirconium.

13. The process of claim 11, wherein each X is a chloride.

14. The process of claim 11, wherein L is a linear divalent $C_2$-$C_{10}$ hydrocarbyl or divalent phenyl group.

15. The process of claim 11, wherein L is a linear divalent $C_5$ hydrocarbyl or divalent phenyl group.

16. The process of claim 11, wherein the catalyst compound is represented by any of the structures E1 to E9:

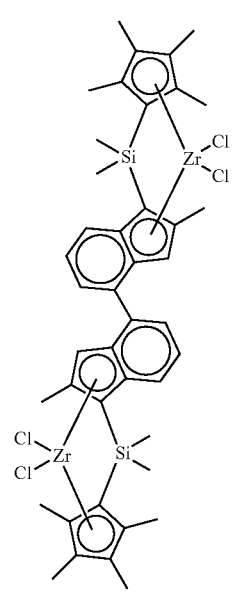

Compound E1

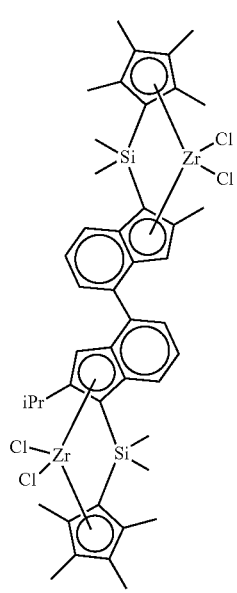

Compound E2

Compound E3
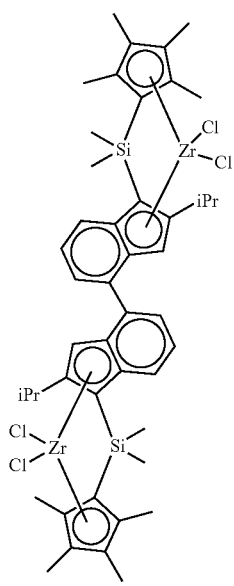
Compound E4
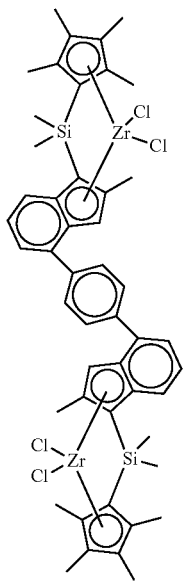
Compound E5
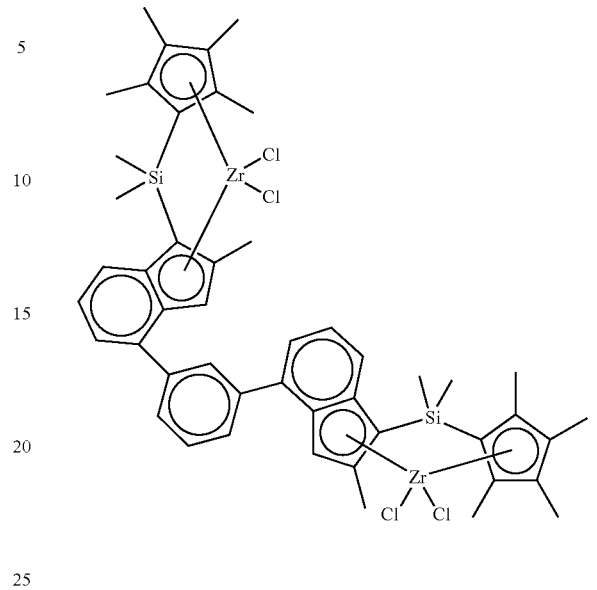
Compound E6
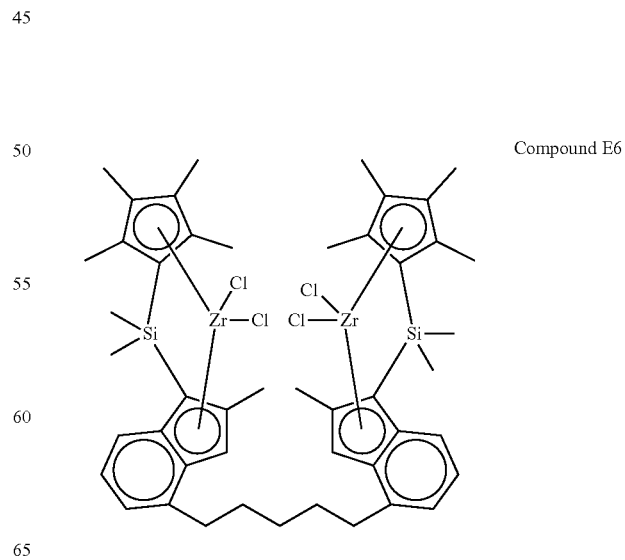

-continued

Compound E7

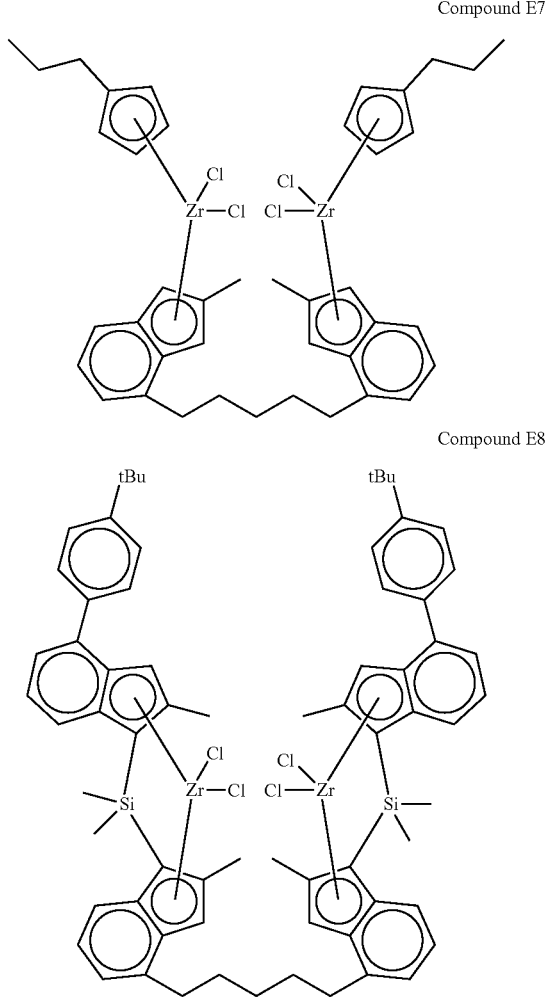

Compound E8

Compound E9

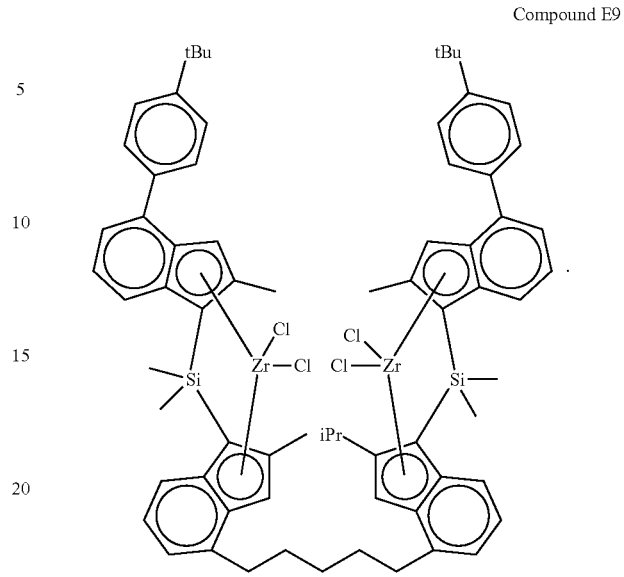

17. The process of claim 11, wherein the catalyst is unbridged and the optional T is not present.

18. The process of claim 11, wherein the catalyst is bridged and T is represented by the formula: $(R*_2G)_g$, where each G is C, Si, or Ge, g is 1 or 2, and each R* is, independently, hydrogen, halogen, $C_1$ to $C_{20}$ hydrocarbyl or a $C_1$ to $C_{20}$ substituted hydrocarbyl.

19. The process of claim 18, wherein two or more R* form an aromatic or a partially saturated or saturated cyclic or fused ring system.

20. The process of claim 11, wherein the first olefin is propylene and the second olefin is present and is ethylene or one or more olefins selected from $C_4$ to $C_{40}$ olefins.

* * * * *